United States Patent
Wakino

(10) Patent No.: US 9,600,854 B2
(45) Date of Patent: Mar. 21, 2017

(54) DATA PROCESSING APPARATUS AND METHOD OF PROCESSING A PLURALITY OF INPUT DATA BASED ON RESPECTIVE ATTRIBUTE INFORMATION THEREOF

(71) Applicant: CANON KABUSHIKI KAISHA, Tokyo (JP)

(72) Inventor: Shiori Wakino, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/919,928

(22) Filed: Oct. 22, 2015

(65) Prior Publication Data
US 2016/0125569 A1    May 5, 2016

(30) Foreign Application Priority Data
Oct. 29, 2014  (JP) .................. 2014-220598

(51) Int. Cl.
G06K 9/46    (2006.01)
G06T 1/60    (2006.01)

(52) U.S. Cl.
CPC .............. G06T 1/60 (2013.01); G06K 9/4604 (2013.01)

(58) Field of Classification Search
None
See application file for complete search history.

(56) References Cited

U.S. PATENT DOCUMENTS 5,850,475 A   12/1998  Kasao

FOREIGN PATENT DOCUMENTS

JP    2007272681 A    10/2007

OTHER PUBLICATIONS

Achanta et al., "SLIC Superpixels Compared to State-of-the-Art Superpixel Methods", IEEE Transactions on Pattern Analysis and Machine Intelligence, vol. 34, No. 11, pp. 2274-2282, Nov. 2012.*
Jiang et al., "A Hardware Architecture for Real-Time Video Segmentation Utilizing Memory Reduction Techniques", IEEE Transactions on Circuits and Systems for Video Technology, vol. 19, No. 2, pp. 226-236, Feb. 2009.*
Neubert et al., "Compact Watershed and Preemptive SLIC: On Improving Trade-offs of Superpixel Segmentation Algorithms", International Conference on Pattern Recognition (ICPR), pp. 996-1001, Aug. 2014.*

* cited by examiner

Primary Examiner — Feng Niu
(74) Attorney, Agent, or Firm — Rossi, Kimms & McDowell LLP

(57) ABSTRACT

An input data controlling unit preferentially outputs pixel data of an area label for which the operation result is held in a cache. In regard to pixel data of an area label for which the operation result is not held, the input data controlling unit once accumulates the plurality of pixel data in an internal FIFO and then outputs the accumulated pixel data in a lump, to suppress occurrence of a cache miss in the cache. Besides, when accumulating the pixel data in the FIFO, the input data controlling unit reduces a frequency that the area label is changed, by accumulating the pixel data in the FIFO until the FIFO comes to be full of pixel data as much as possible, thereby further suppressing the cache miss.

11 Claims, 20 Drawing Sheets

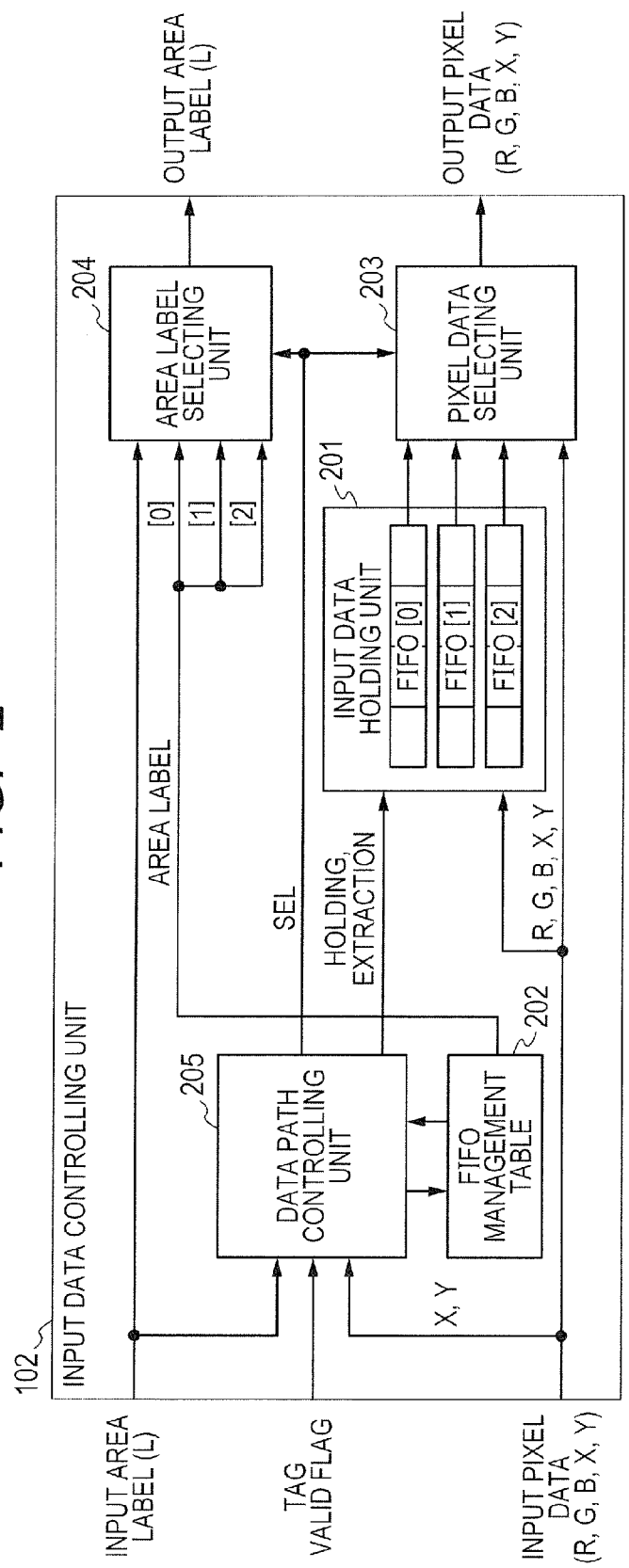

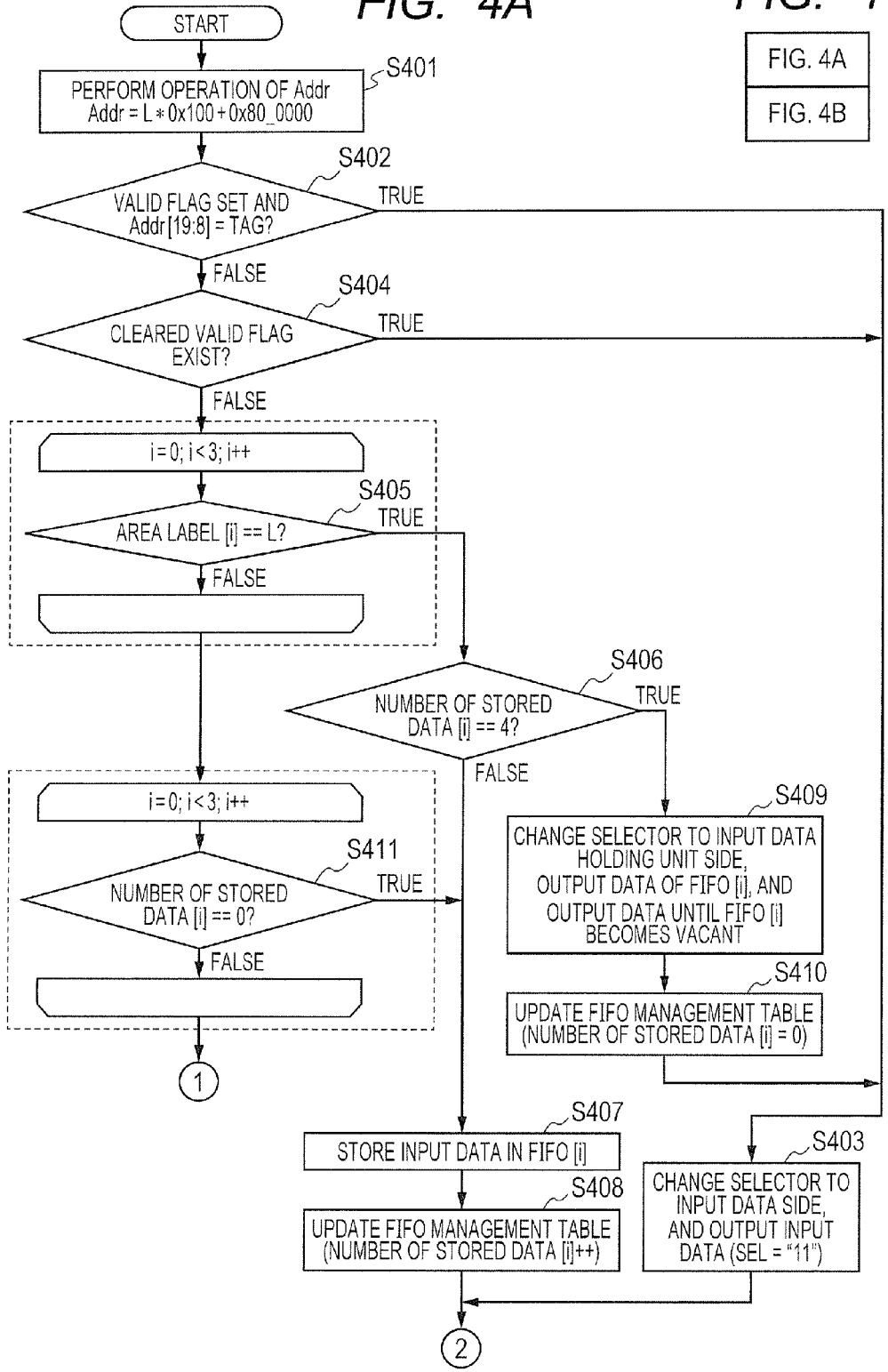
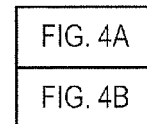
FIG. 4A

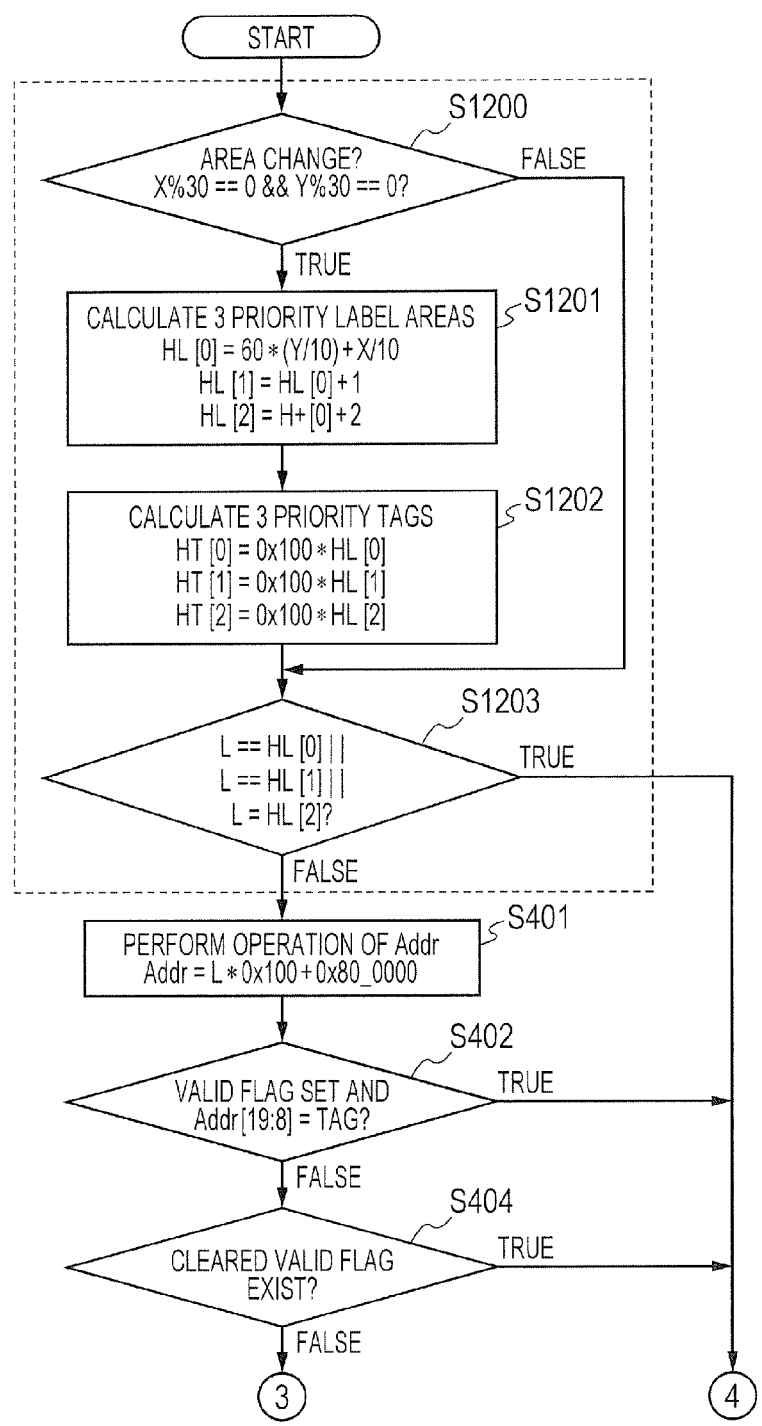

DATA PROCESSING APPARATUS AND METHOD OF PROCESSING A PLURALITY OF INPUT DATA BASED ON RESPECTIVE ATTRIBUTE INFORMATION THEREOF

BACKGROUND OF THE INVENTION

Field of the Invention

The present invention relates to data processing apparatus and method of processing a plurality of input data based on respective attribute information thereof. Particularly, the present invention relates to data processing apparatus and method which are suitable for dividing an image into a plurality of areas based on its attribute and processing the divided image for each area.

Description of the Related Art

Conventionally, an area dividing (segmentation) method is used as technique of dividing an image into a plurality of areas such that each of the areas has same attributes such as color, pattern, brightness and the like (e.g., Japanese Patent Application Laid-Open No. 2007-272681). Since an encoding process and an area recognizing process can be then performed for each of the areas divided by the area dividing method, a process amount can be wholly reduced as compared with a case where an image is processed for each pixel. In recent years, the number of cases where an image process is performed to a high-resolution image by an embedded device increases. On such a premise, it is supposed to be able to, by processing the image for each of the areas after the division, perform the complicated processes in real time for the high-resolution image even by the embedded device.

From this kind of circumstance, several methods for achieving a real-time area dividing process have been proposed. In these methods, there is a method called an SLIC (simple linear iterative clustering) method of dividing an image into areas by performing clustering of pixel data using five-dimensional information of a color space (R, G, B) and a coordinate space (X, Y).

In the SLIC method, representative data serving as the center of a cluster is first arranged grid-likely in an image. Each of the representative data has five-dimensional information of a color space (l, a, b) and the coordinate space (X, Y). Incidentally, although CIELAB (l, a, b) is used as the color space in the SLIC method, also RGB (R, G, B), YCC (Y, Cb, Cr) or the like can be used. The representative data is also called a seed or a cluster centroid. In the SLIC method which is based on a k-means method being one of the clustering, each pixel is clustered to the representative point arranged grid-likely. In any case, the SLIC method is different from the k-means method in the point that the coordinate space to be clustered to the representative point is limited to a predetermined range. Since the shapes of the areas generated or formed by the SLIC method are relatively the same, the number of the areas becomes stable. The divided areas are called superpixels.

Besides, technique of recognizing an object using the superpixels has been developed, and this technique is applied to shot-image scene decision or the like. In the process of recognizing the object using the superpixels, the feature amounts of the superpixels are extracted, and the object is recognized by analyzing the extracted feature amounts. Besides, the accumulated data of the feature amount extracted for each of the pixels forming the superpixel may be adopted as the feature amount of the superpixel.

Incidentally, in the process of extracting the feature amounts of the superpixels, an accumulating operation is performed. In case of performing the operation such as the accumulating operation in which the past operation result is referred, if the past operation result cannot be held internally, read-modify-write access to an external memory occurs. Here, the access to the external memory takes an access latency corresponding to time from data request to data arrival. Therefore, in case of frequently accessing the external memory, the access to the external memory is a bottleneck, so that a problem that performance of a feature amount operation does not increase occurs.

Accordingly, a cache is generally known as a method of reducing reading and writing time for a memory. Namely, when the cache is used, it is possible to reduce the number of times of accessing the memory by holding a partial data of the memory area in the cache and repetitively using the held data.

However, when an image in which objects are complicated is divided, also the area division result in which a plurality of area labels are complicated is obtained. For this reason, in regard to an image in which a plurality of area labels are frequently changed, a hit rate of the cache decreases, and thus performance deteriorates. Therefore, in case of improving the hit rate in a system using the cache, it is supposed to increase a cache data capacity or design a cache update algorithm.

For example, Japanese Patent Application Laid-Open No. 2007-272681 proposes to generate, by analyzing an instruction to be executed, profile information indicating a possibility that the data stored in each cache line is again referred, and then, when a cache miss occurs, determine the cache line to be replaced on the basis of the generated profile information, thereby suppressing future occurrence of the cache miss.

However, if the cache data capacity is increased so as not to decrease the cache hit rate even for the image containing the complicated objects, a problem that the circuit scale increases occurs. In addition, since complicated design is necessary for the complicated cache update algorithm, the hardware to be added increases in such a case.

SUMMARY OF THE INVENTION

An object of the present invention is to provide data processing apparatus and method of processing a plurality of input data based on respective attribute information thereof without any complicated algorithm and large circuit scale.

To achieve the above object of the present invention, a data processing apparatus according to the present invention is characterized by comprising: a controlling unit configured to receive a plurality of input data and respective attribute information thereof, and output the input data and the attribute information in an order based on the attribute information; an operating unit configured to perform an operation on the input data output from the controlling unit, by referring to a past operation result related to the attribute information of the input data; and a holding unit configured to hold the past operation result of the operating unit, and characterized in that the controlling unit controls the order of outputting the plurality of input data, based on whether or not the past operation results related to the respective attribute information of the plurality of input data are held in the holding unit.

Further features of the present invention will become apparent from the following description of exemplary embodiments with reference to the attached drawings.

BRIEF DESCRIPTION OF THE DRAWINGS

FIG. 2 is a block diagram illustrating an internal constitution example of an input data controlling unit according to the first embodiment.

FIG. 3 is a diagram illustrating an example of an FIFO (first-in, first-out) management table.

DESCRIPTION OF THE EMBODIMENTS

Preferred embodiments of the present invention will now be described in detail in accordance with the accompanying drawings.

First Embodiment

Hereinafter, the embodiment of the present invention will be described with reference to the attached drawings. Initially, a general processing procedure of performing area division of an image and extracting feature amounts of the divided areas will be described.

Figure 15:
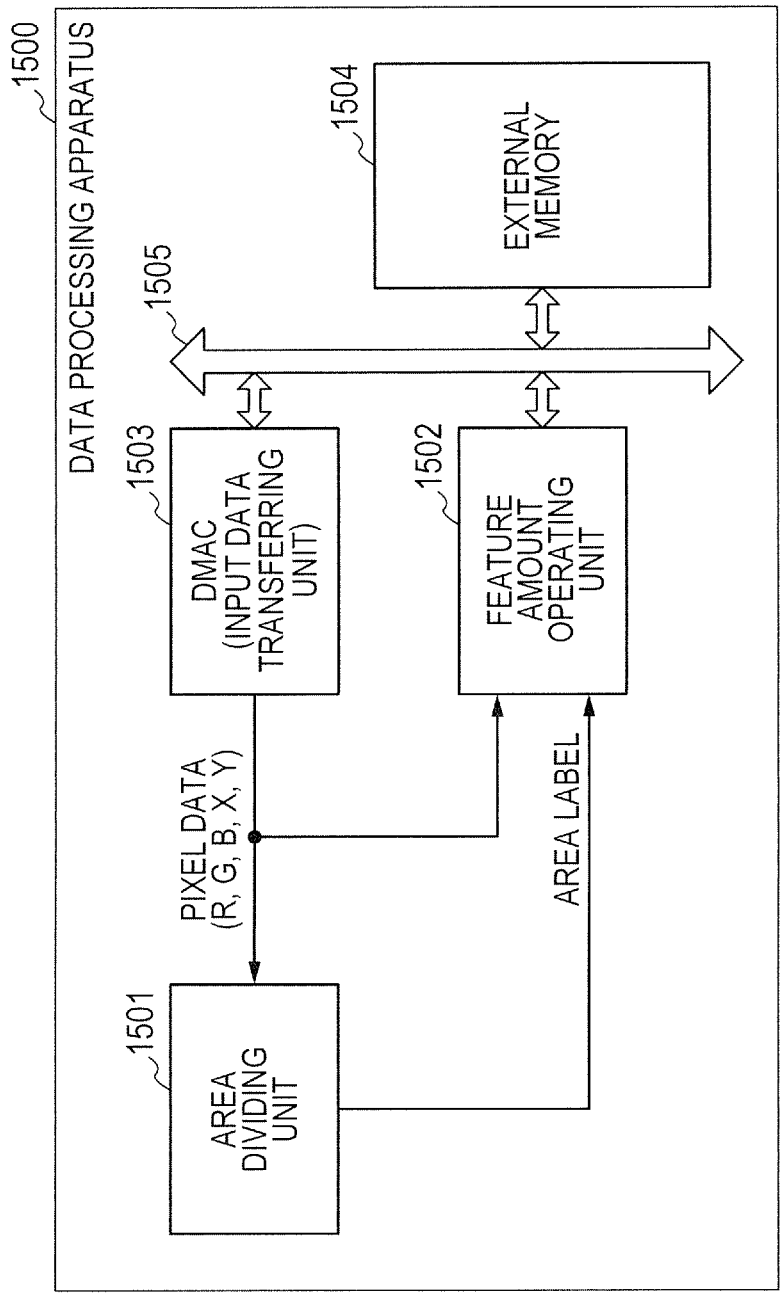
FIG. 15 is a block diagram illustrating a constitution example of a prior-art general data processing apparatus which divides an image into a plurality of areas and extracts a feature amount of each of the divided areas.

FIG. 15 is a block diagram illustrating a constitution example of a prior-art general data processing apparatus which divides an image into a plurality of areas and extracts a feature amount of each of the divided areas.

A data processing apparatus 1500 illustrated in FIG. 15 divides input image data into areas having a uniform feature, calculates feature amounts of the divided areas, makes a plurality of blocks of the image data, and performs a process for each of the plurality of blocks. Here, the method of performing the process for each block is disclosed in, e.g., U.S. Pat. No. 5,850,475.

The data processing apparatus 1500 comprises an area dividing unit 1501, a feature amount operating unit 1502, a DMAC (direct memory access controller) 1503 and an external memory 1504. The feature amount operating unit 1502 and the DMAC 1503 are respectively connected to the external memory 1504 via a system bus 1505.

Hereinafter, the functions of the respective blocks illustrated in FIG. 15 and an operation to be performed to process input image data 1601 illustrated in FIG. 16 will be described. That is, color data (R, G, B) of an input image and information indicating a representative point to be used for an area dividing process have been stored in the external memory 1504. Further, the external memory is used as the area for storing the operation result of the feature amount operating unit 1502. Also, the external memory can be used as the area for storing another process result.

The DMAC 1503 reads the input image data from the external memory 1504 in raster order for each block, and transfers the read image data to the area dividing unit 1501 and the feature amount operating unit 1502 for each pixel. Besides, the DMAC 1503 has a function to calculate the coordinates (X, Y) of the image data from the address from which the input image data is read. Thus, the DMAC extends pixel data to pixel data (R, G, B, X, Y) and transfers the extended pixel data to the area dividing unit 1501 and the feature amount operating unit 1502. Moreover, the DMAC 1503 also reads information indicating the representative point arranged in the block to be used for the area dividing process and representative points of peripheral blocks, from the external memory 1504, and then transfers the read information to the area dividing unit 1501.

The area dividing unit 1501 inputs the information of the representative points and the information of the pixel data (R, G, B, X, Y) from the DMAC 1503, performs clustering of the pixel data to any of the representative points, and outputs area labels to the feature amount operating unit 1502. At this time, the area dividing unit may write back the area division result to the external memory 1504 via the DMAC 1503.

The feature amount operating unit 1502 operates the feature amounts of pixels using the information of the pixel data (R, G, B, X, Y) output from the DMAC 1503, and accumulates the operated feature amounts for each area label. At this time, since the feature amount of one pixel might become 256 bytes, the feature amounts are temporarily stored in the external memory 1504. Besides, when the area label is input from the area dividing unit 1501, the feature amount operating unit 1502 reads the past operation result corresponding to the input area label from the external memory 1504, adds the operated feature amount to the past operation result, and writes the result obtained by the addition to the external memory 1504.

In case of calculating the feature amounts for each area, the operation in which the past operation result is referred is performed like the accumulating operation. Therefore, in case of frequently accessing the external memory, the access to the external memory is a bottleneck so that performance of the feature amount operation does not increase. Therefore, by using the cache, it is possible to reduce the number of times of accessing the memory by holding a partial data of the memory area in the cache and repetitively using the held data. However, in case of dividing the image which contains the complicated objects, also the area division result contains the plurality of complicated area labels. Consequently, in a case where the area labels are frequently changed when the pixel data are sequentially read from the image, a hit rate of the cache decreases, so that the performance deteriorates.

Figure 16:
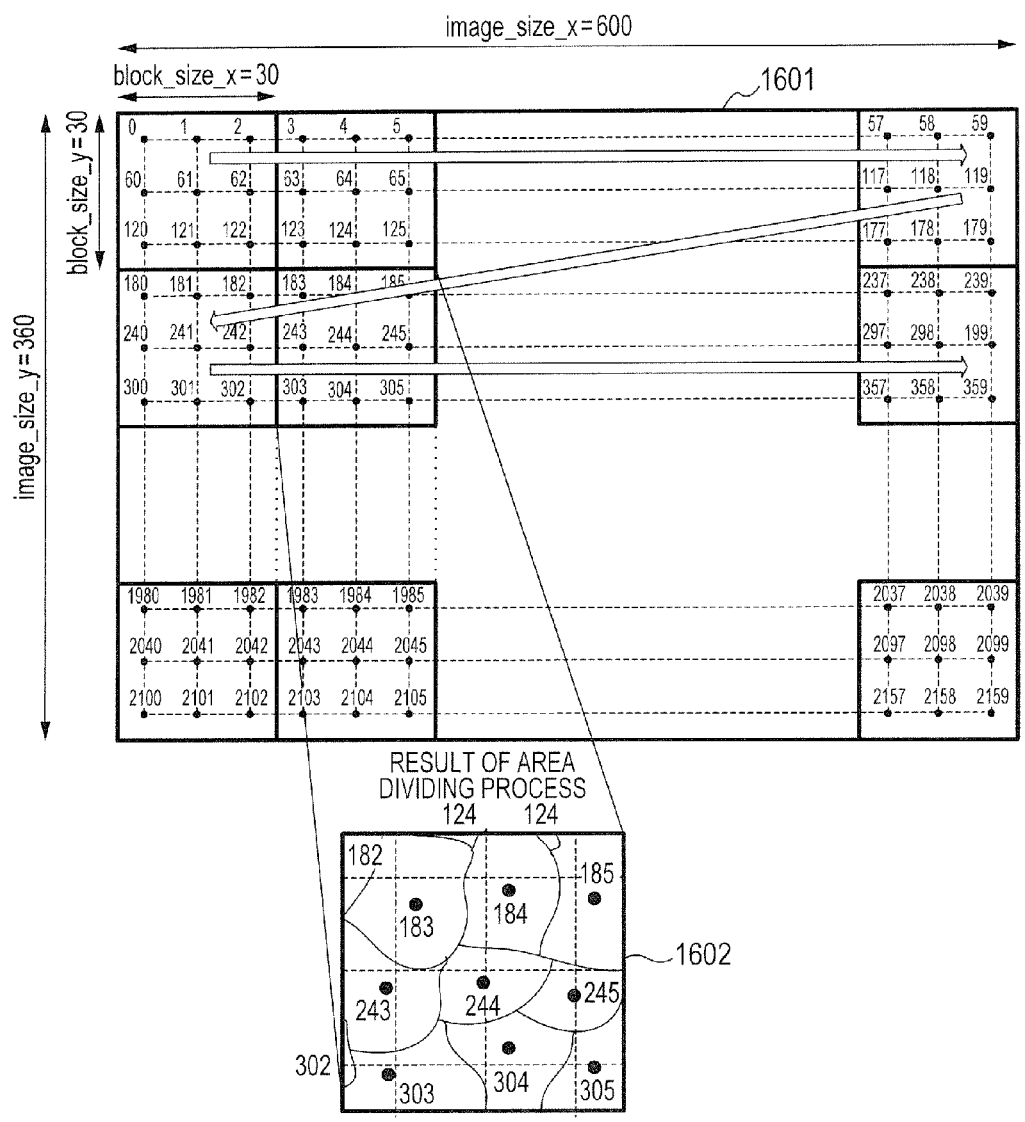
FIG. 16 is a diagram for describing an area dividing process.

For example, as illustrated in FIG. 16, the pixel in one block is allocated to the initial label or the peripheral label. The proportion of the initial labels is larger than the proportion of the peripheral labels. In case of performing the process in raster order, the peripheral area label which only appears sporadically is processed sequentially as well as the initial labels. Therefore, since the content of the cache is updated according to the operation result of the area label of which the frequency of appearance is low, the operation result of the area label of which the frequency of appearance is high may be cached out according to circumstances.

Consequently, in the present embodiment, a data processing apparatus which is equipped with a cache and in which a hit rate of the cache is improved without increasing the circuit scale is provided. Hereinafter, the first embodiment of the present invention will be described with reference to FIGS. 1 to 9.

Figure 1:
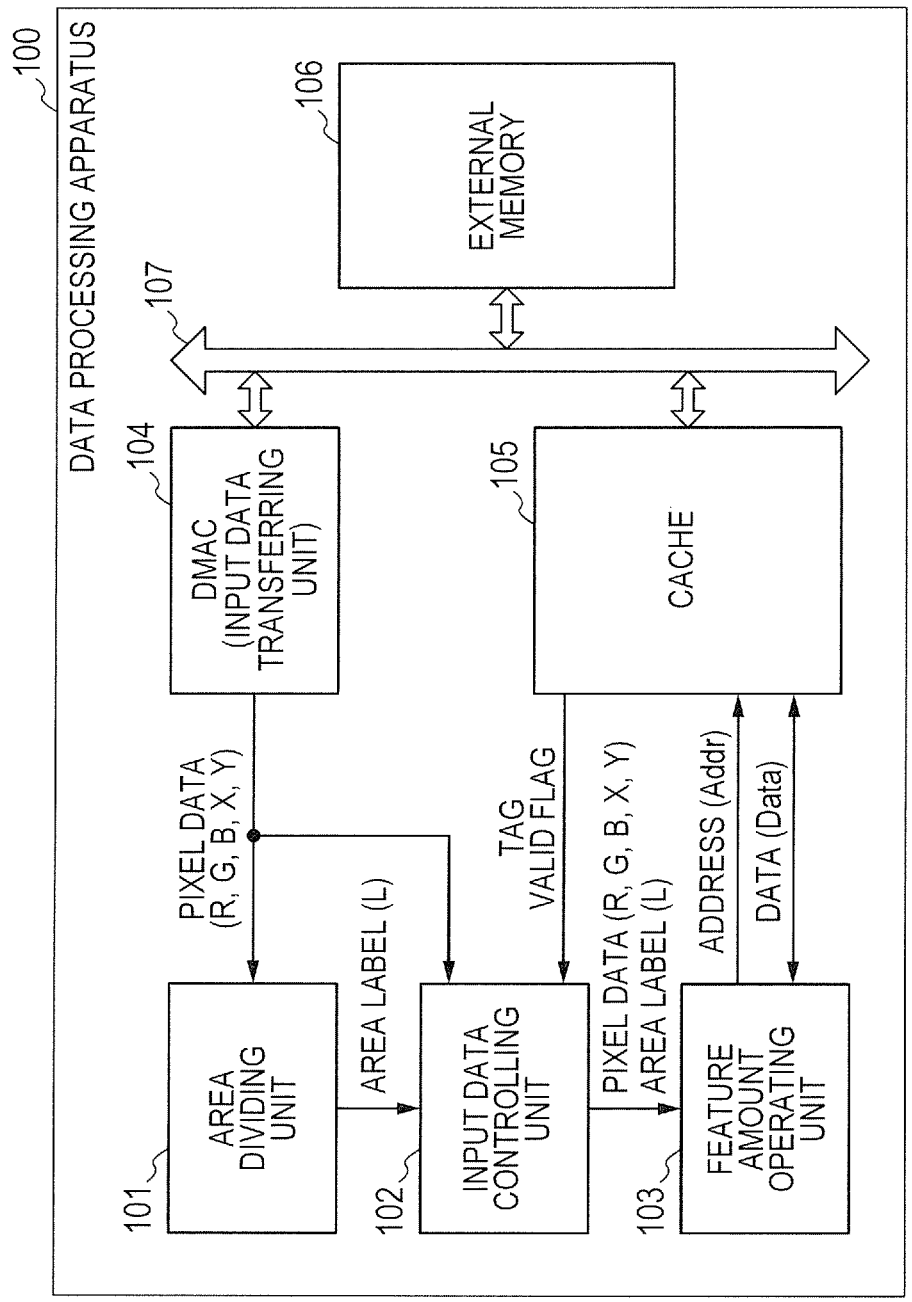
FIG. 1 is a block diagram illustrating a constitution example of a data processing apparatus according to the first embodiment.

FIG. 1 is a block diagram illustrating a constitution example of a data processing apparatus 100 according to the present embodiment. Hereinafter, an example that the data processing apparatus processes the image data 1601 of FIG. 16 will be described.

The data processing apparatus 100 illustrated in FIG. 1 divides the input image data into the plurality of areas, and calculates the respective feature amounts of the divided areas. At this time, the input image data is divided into the plurality of blocks, and the process is performed for each block. The data processing apparatus 100 comprises an area dividing unit 101, an input data controlling unit 102, a feature amount operating unit 103, a DMAC 104, a cache 105 and an external memory 106. Here, the DMAC 104 and the cache 105 are respectively connected to the external memory 106 via a system bus 107.

Subsequently, the functions of the respective blocks illustrated in FIG. 1 and the operation (working) for processing the image data 1601 illustrated in FIG. 16 will be described.

The input data necessary for the process has been stored in the external memory 106, and the input data has previously been prepared by the process of a not-illustrated CPU (central processing unit) or the like. Besides, the external memory 106 is also used as the area for storing the process result of each block.

Figure 7:
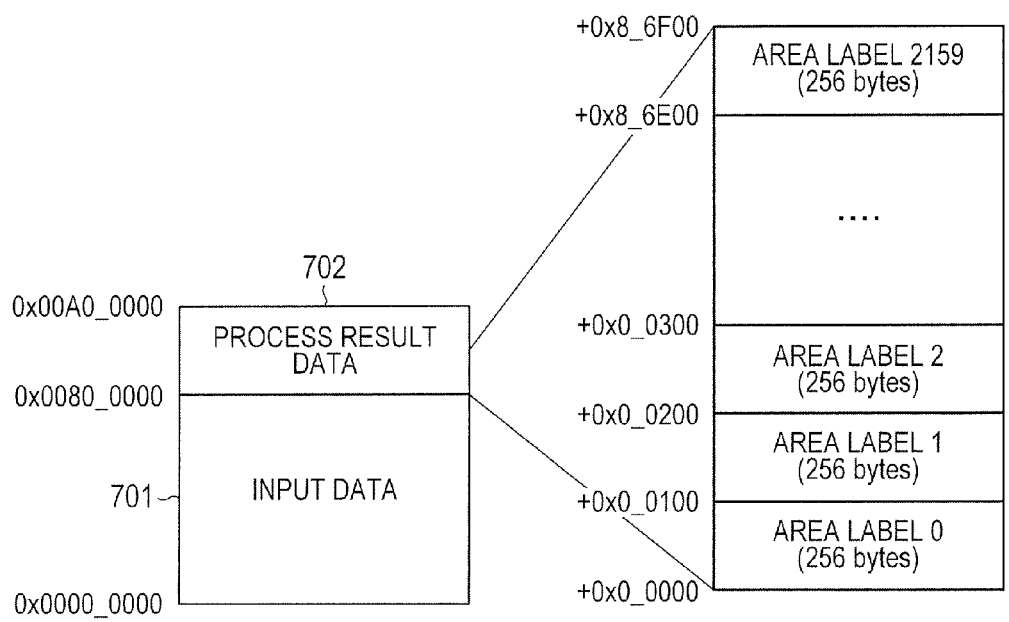
FIG. 7 is a diagram for describing external memory areas.

FIG. 7 is a diagram for describing the areas of the external memory 106. That is, in an input data storing area 701, image data (R, G, B), representative point information used for the process by the area dividing unit 101, and other parameters are stored. In a process result data storing area 702, the operation result of the area feature amount generated by the feature amount operating unit 103 is stored. Here, the capacity corresponding to the data amount of the area feature amount×the number of area labels is necessary for the area 702 to store the operation result of the area feature amount. In the present embodiment, it is assumed that the data amount of the area feature amount is 256 bytes and the area labels are allocated as "0", . . . , "0x80_0000", "0x80_0100", "0x80_0200", . . . "0x88_6EFF" in sequence. It may be possible to store the process result of the area dividing unit 101 in subsequent areas.

The DMAC 104, which is controlled by the not-illustrated CPU, performs data transfer between the area dividing unit 101 and the external memory 106 and between the input data controlling unit 102 and the external memory 106. More specifically, when a process start trigger is given by the CPU, the DMAC 104 reads, from the area 701 of the external memory 106 in which the input data is stored, the parameter and the representative point data which are necessary for the one-block area dividing process by the area dividing unit 101, and transfers the read parameter and data to the area dividing unit 101. After then, the DMAC reads the image data for each block in raster order, and transfers the read data to the area dividing unit 101 and the input data controlling unit 102 for each pixel.

Further, the DMAC 104 can calculate the coordinates (X, Y) of the pixel data from the address at which the image data is read. Thus, the DMAC extends the pixel data to the pixel data (R, G, B, X, Y) based on the calculation result, and transfers the extended pixel data to the area dividing unit 101 and the input data controlling unit 102. Also, the DMAC 104 can store the dividing process result of the area dividing unit 101 in the external memory 106. After ending the transfer of all the image data, the DMAC 104 notifies the CPU of a process end.

The area dividing unit 101 divides the image into the plurality of areas by performing clustering of the pixel data to any of the representative points using the representative point information and the pixel data (R, G, B, X, Y). Incidentally, the area dividing unit 101 may be constituted by dedicated hardware, or by a CPU executing programs.

More specifically, the area dividing unit 101 first receives the parameter related to the area dividing process from the DMAC 104, inputs the representative point information necessary for the one-block process, inputs the one-block pixel data in raster order, and starts the area dividing process. Then, the area dividing unit decides to which area corresponding to which representative point each pixel belongs, and transfers area label information (L) being the attribute information indicating the decided area to the input data controlling unit 102. At this time, the area dividing unit may transfer the area label information (L) also to the DMAC 104 and store the dividing process result in the external memory 106.

In FIG. 16, the image data 1601 is an example of the image data to be processed by the data processing apparatus 100 illustrated in FIG. 1, and an area division result process result 1602 is an example of the area dividing process result performed by the area dividing unit 101. In the example illustrated in FIG. 16, the image size is equivalent to vertical 360 pixels and horizontal 600 pixels, and the pixel data is constituted by 24-bit color data (R, G, B). The coordinate position of the image is set such that the upper left coordinates are the original point (X, Y)=(0, 0), the value of the X coordinate increases toward the horizontal right direction, and the value of the Y coordinate increases toward the vertical downward direction. The image data is divided into the blocks each having vertical and horizontal 30 pixels, and the process is advanced from the original point toward the horizontal direction. Then, after the process reached the right edge of the image data, it returns to the position of X=0, and the process is performed to the lower blocks.

Here, the area dividing process is performed on the premise that the nine representative points are arranged in one block. More specifically, the representative points are first arranged grid-likely in the whole of the image, and unique numbers (hereinafter, called area labels) such as "0", "1", "2", ... and "2159" are allocated respectively to the representative points. After the area dividing process, each representative point is corrected to the center of each area. Each pixel belongs to any of the areas, and the corresponding area label is allocated to the relevant pixel. In regard to the pixel in one block, the area label (initial label) of any of the representative points arranged in the relevant block or the area label of the representative point of its peripheral block is first allocated. There is a high possibility that, as compared with the peripheral label, the initial label is allocated. For example, in the block of FIG. 16 in which the initial labels "183", "184", "185", "243", "244", "245", "303", "304" and "305" are allocated, the process result (i.e., the result of the area dividing process) 1602 is given. The example shown in the process result 1602 is an example that "124", "182" and "302" being the area labels of the representative points of the peripheral blocks are allocated to some pixels in the block. The feature amount of each of the divided areas can be obtained by accumulating the feature amounts of the pixels to which the same area label is allocated.

The feature amount operating unit 103 extracts the feature amount by using the pixel data (R, G, B, X, Y), and accumulates the extracted feature amounts of the pixel data of the same area label. Incidentally, the feature amount operating unit 103 may be constituted by dedicated hardware, or by a CPU executing programs.

More specifically, the feature amount operating unit 103 inputs the pixel data (R, G, B, X, Y) from the input data controlling unit 102, and performs the operating process to the input pixel data. Here, the feature amounts to be operated are an RGB color average, X and Y moments, a color histogram and the like. Then, when the area label information (L) is received from the input data controlling unit 102, the feature amount operating unit requests the past operation result of the same area label to the cache 105. The address at which the operation result requested has been stored is uniquely determined based on the offset address (here, 0x80_0000)+the area label number×256. Then, when the operation result is received from the cache 105, the feature amount operating unit adds the input pixel data to the received operation result, and writes back it to the same address.

Figure 5:
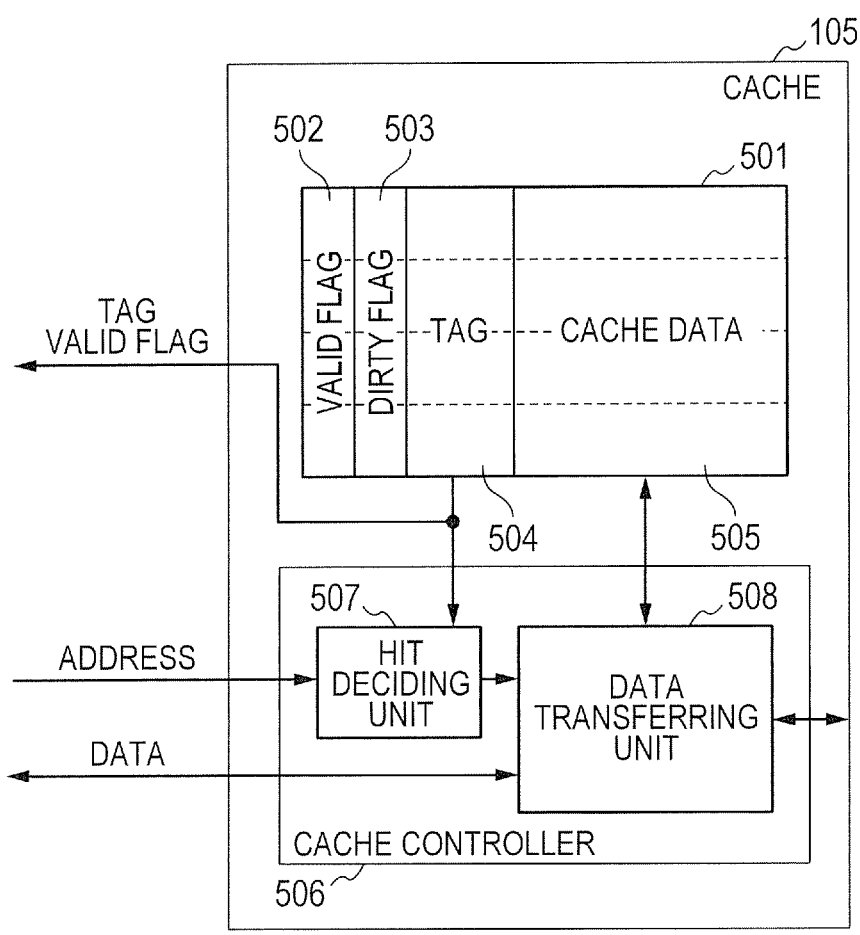
FIG. 5 is a block diagram illustrating an internal constitution example of a cache according to the first embodiment.

The cache 105 is the function block which transfers data between the feature amount operating unit 103 and the external memory 106. FIG. 5 is a block diagram illustrating an internal constitution example of the cache 105 in the present embodiment.

As illustrated in FIG. 5, the cache 105 comprises a cache memory 501 and a cache controller 506. In the cache memory 501, a valid flag area 502, a dirty flag area 503, a tag area 504 and a data area 505 are allocated. Hereinafter, the respective areas will be described.

In the valid flag area 502, a valid flag indicating whether or not the data in the data area 505 is valid is stored. In the dirty flag area 503, a dirty flag indicating whether or not it is necessary to write back the cache line to the external memory 106 is stored. In the data area 505, copy data (cache data) of the external memory 106 is stored.

In the cache 105 of the present embodiment, the cache line is assumed to be 356 bytes capable of storing the feature amount operation result of one area label, and each cache line is assumed to have the valid flag, the dirty flag and the tag. Further, a mapping method is assumed to be a full associative method. Here, the size of the cache 105 is assumed to be 1 kilobyte capable of storing the feature amount operation result of four areas. The lower eight bits of the address is assumed to indicate the address on the cache line, and the 12 bits of the address $9^{th}$ to $20^{th}$ bits are assumed to be stored in the tag area 504 to be able to identify the head address of the area label. Incidentally, the $21^{st}$ to $32^{nd}$ bits correspond to the offset address, and it is unnecessary to store them in the tag area 504 because the offset address is a fixed value. Namely, only a static value may be held in the register of the cache 105. The mapping method of the cache 105 is not limited to the full associative method. Namely, a set associative method or a direct mapping method is applicable.

The cache controller 506, which is the controller of controlling reading and writing in regard to the cache memory 501, comprises a hit deciding unit 507 and a data transferring unit 508. Here, the hit deciding unit 507 compares the address requested with the address stored in the tag area 504 to decide whether or not the request data exists in the cache memory 501. Then, a cache hit is decided when the request data exists, whereas a cache miss is decided when the request data does not exist.

The data transferring unit 508 performs the data transfer between the feature amount operating unit 103 and the cache memory 501 or the data transfer between the cache memory 501 and the external memory 106, according to the decision result by the hit deciding unit 507.

Incidentally, it is assumed that, when the cache miss occurs, the tag arrangement is determined by an LRU (Least-Recently-Used) method of replacing the line which is not referred to for the longest time in the cache, and thus an LRU queue (which is not shown) is provided in the cache controller 506. The LRU queue is the queue which indicates the lines which are not referred to for long time in order from the head. When the data is read to the cache line in which the valid flag is not on, its tag is stored at the tail end of the LRU queue. Further, when the cache line is replaced, the tag before the replacement is extracted (or removed) from the LRU queue, and the tag after the replacement is stored at the tail end thereof. Furthermore, when the cache line is accessed, the accessed tag is once extracted from the LRU queue and stored at the tail end thereof.

The data corresponding to all the cache lines of the valid flag area 502 and the tag area 504 are output outward, and thus the internal state of the cache 105 can be referred externally.

Figure 6:
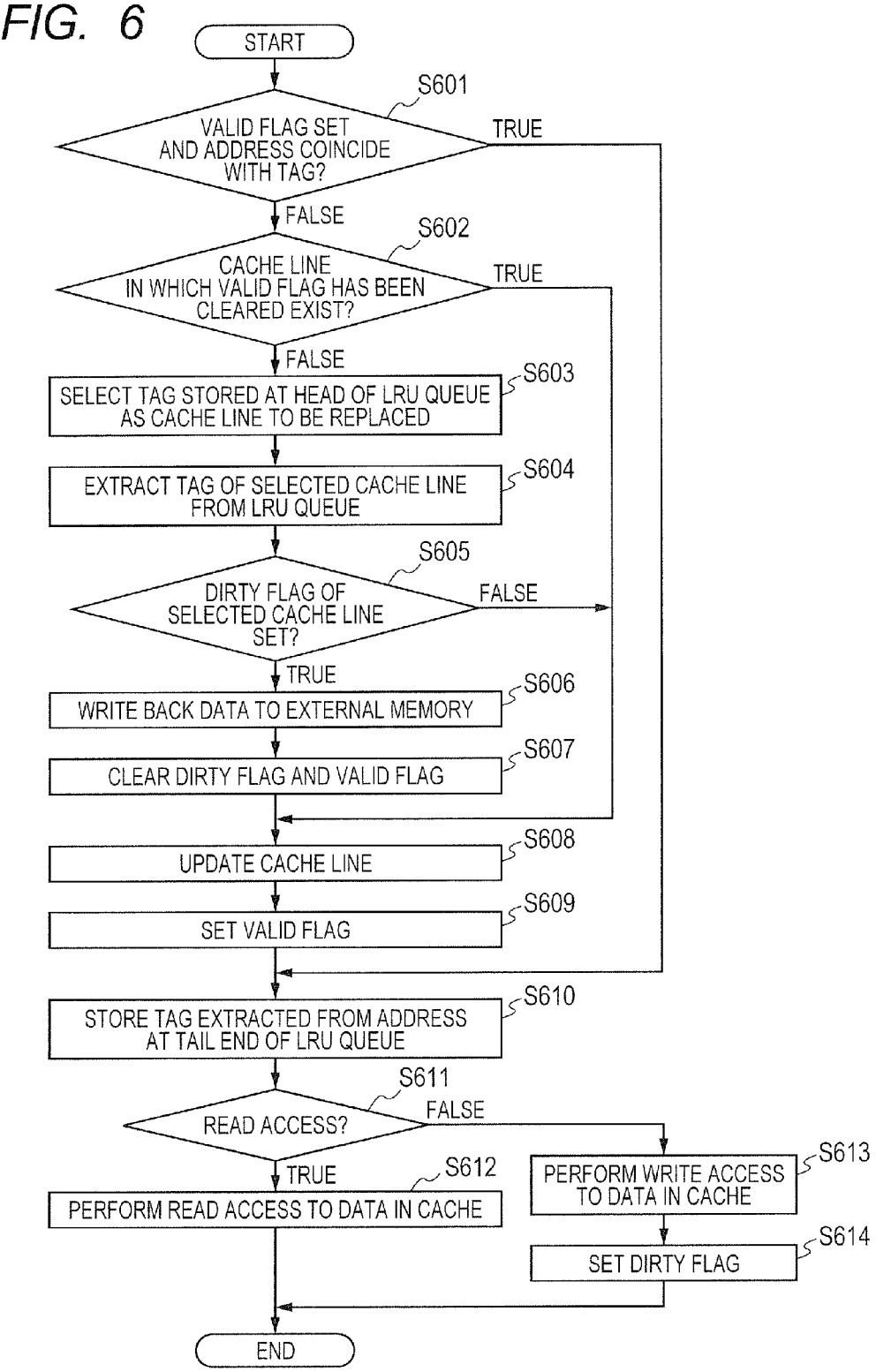
FIG. 6 is a flow chart indicating an example of a processing procedure to be performed by a cache controller according to the first embodiment.

FIG. 6 is a flow chart indicating an example of the processing procedure to be performed by the cache controller 506. Here, an operation to be performed when the data to which the feature amount operating unit 103 accesses is not stored in the cache memory 501 will be described.

Initially, the process is started when the access is performed from the feature amount operating unit 103. The hit deciding unit 507 compares the requested address with the address stored in the tag area 504, by searching the tag area 504 of the cache line in which the valid flag is on, to decide the cache hit or the cache miss (S601). Then, if it is decided that the addresses coincide with each other (the cache hit), the process advances to S610.

On the other hand, if it is decided in S601 that the addresses do not coincide with each other (the cache miss), the cache controller 506 further decides whether or not the cache line in which the valid flag has been cleared exists (S602). If it is decided that the cache line in which the valid flag has been cleared exists, the process advances to S608.

On the other hand, if it is decided in S602 that the cache line in which the valid flag has been cleared does not exist, the cache controller 506 selects the tag stored at the head in the LRU queue as the tag of the cache line to be replaced (S603). Then, the cache controller extracts the tag of the selected cache line from the LRU queue (S604).

Next, the cache controller 506 decides whether or not the dirty flag of the selected cache line has been set (S605). If it is decided that the dirty flag has been set, the data transferring unit 508 writes back the data of the selected cache line to the external memory 106 (S606). Then, the cache controller 506 clears the dirty flag of the selected cache line and the valid flag (S607). On the other hand, if it is decided in S605 that the dirty flag has not been set, the process skips S606 and S607 and advances to S608.

Next, the data transferring unit 508 reads the data corresponding to the cache line to which the feature amount operating unit 103 accesses from the external memory 106 to the cache 105, to update the cache 105 (S608). After the update of the cache, the cache controller 506 sets the valid of the cache line concerned (S609), and stores the tag extracted from the address to the tail end of the LRU queue (S610).

Next, the cache controller 506 decides whether or not the access of the feature amount operating unit 103 is a read access (S611). If it is decided that the access is the read access, the data transferring unit 508 transfers the corresponding data to the feature amount operating unit 103 (S612). On the other hand, if it is decided in S611 that the access is a write access, the cache controller 506 updates the cache line by the data to be written (S613), and sets the dirty flag (S614).

Next, an operation to be performed when the data to which the feature amount operating unit 103 accesses has been stored in the cache memory 501 will be described. The process is started when the access is performed from the feature amount operating unit 103. Then, if the cache hit is decided by the hit deciding unit 507 in S601, the process to be performed in S602 to S609 is omitted, and the cache controller 506 decides whether or not the access of the feature amount operating unit 103 is the read access (S611). If it is decided that the access is the read access, the corresponding data is transferred to the feature amount operating unit 103 (S612). On the other hand, if it is decided that the access is the write access, the cache line is updated by the data to be written (S613), and the dirty flag is set (S614). In this case, the access to the external memory 106 is not performed.

Then, the constitution example illustrated in FIG. 1 will again be described. The input data controlling unit 102 outputs the input data while changing the order thereof in accordance with the internal state of the cache 105. The input data controlling unit 102 receives the pixel data (R, G, B, X, Y) from the DMAC 104, receives the area label information (L) of the relevant pixel data from the area dividing unit 101, and outputs the pixel data (R, G, B, X, Y) and the area label information (L) for output to the feature amount operating unit 103. Hereinafter, the pixel data and the area label which are input are respectively called the input pixel data and the input area label, and the pixel data and the area label which are output are respectively called the output pixel data and the output area label. The input data controlling unit 102 grasps that the operation result of which area label is currently stored in the cache 105, by referring to the tag and the valid flag of the cache 105.

FIG. 2 is a block diagram illustrating a detailed internal constitution example of the input data controlling unit 102.

In FIG. 2, an input data holding unit 201 holds the pixel data (R, G, B, X, Y) received from the DMAC 104. In the present embodiment, each of the pixel data R, G and B is assumed to be eight bits, each of the pixel data X and Y is assumed to be nine bits, and one pixel is assumed to be constituted by 42 bit data. Moreover, the input data holding unit 201 is constituted by three FIFO memories respectively called an FIFO[0], an FIFO[1] and an FIFO[2]. Each of the FIFO[0] to FIFO[2] has four stages so that the pixel data corresponding to four pixels can be stored in one FIFO. Here, the data of the same area label are stored in one FIFO.

An FIFO management table 202 is the table on which the state of the input data holding unit 201 has been stored. FIG. 3 is a diagram illustrating a detailed example of the FIFO management table 202. In an area 301 of "NUMBER" in FIG. 3, a number N corresponds to an FIFO[N]. An area 302 of "NUMBER OF STORED DATA" indicates the number of data stored in the FIFO. For example, the number "0" indicates the state that there is no data in the FIFO, i.e., the state that the FIFO is vacant, and the number "4" indicates the state that the FIFO is full of data because the FIFO has the four stages. An area 303 of "AREA LABEL" indicates that the data of which area label has been stored in the FIFO, and the value of this area is valid when the number of stored data is larger than "0". When the state of the FIFO is updated, also the FIFO management table 202 is updated by a later-described data path controlling unit 205.

A pixel data selecting unit 203 selects one of the input pixel data and the pixel data respectively stored in the internal three FIFO's of the input data holding unit 201, and outputs the selected pixel data. A selection signal SEL is the two-bit signal. The data of the FIFO[0] is selected when the selection signal SEL is "00", the data of the FIFO[1] is selected when the selection signal SEL is "01", the data of the FIFO[2] is selected when the selection signal SEL is "10", and the input pixel data is selected when the selection signal SEL is "11". Then, the selected data is output as the output pixel data.

An area label selecting unit 204 selects one of the input area label and the area labels stored in the area 303 of "AREA LABEL" on the FIFO management table 202, and outputs the selected area label. More specifically, the area label of the FIFO[0] is selected when the selection signal SEL is "00", the area label of the FIFO[1] is selected when the selection signal SEL is "01", the area label of the FIFO[2] is selected when the selection signal SEL is "10", and the input area label is selected when the selection signal SEL is "11". Then, the selected area label is output as the output area label.

The data path controlling unit 205 controls whether to once internally hold or directly output the input pixel data (R, G, B, X, Y) and the input area label (area label information (L)) in accordance with the internal state of the cache 105. Thus, the data path controlling unit instructs to update the FIFO management table 202, and hold/extract the pixel data to/from the input data holding unit 201. Further, the data path controlling unit 205 generates the selection signal SEL to be input to the pixel data selecting unit 203 and the area label selecting unit 204.

The data path controlling unit 205 preferentially outputs the pixel data of the area label of which the operation result has been held in the cache 105. Namely, in regard to the pixel data of the area label of which the operation result has not been held, the plurality of pixel data are once stored in the FIFO of the input data controlling unit 102 and then output in a lump, so as to suppress the cache miss of the cache 105. As just described, since the plurality of pixel data are accumulated in the FIFO, it is possible to suppress that the cache miss due to the low-frequency area label occurs.

Further, in case of accumulating the plurality of pixel data in the FIFO, the pixel data are accumulated until the FIFO comes to be full of data as much as possible. Thus, the frequency of area label change is reduced, so that cache miss suppression effect can be improved.

Figure 4B:
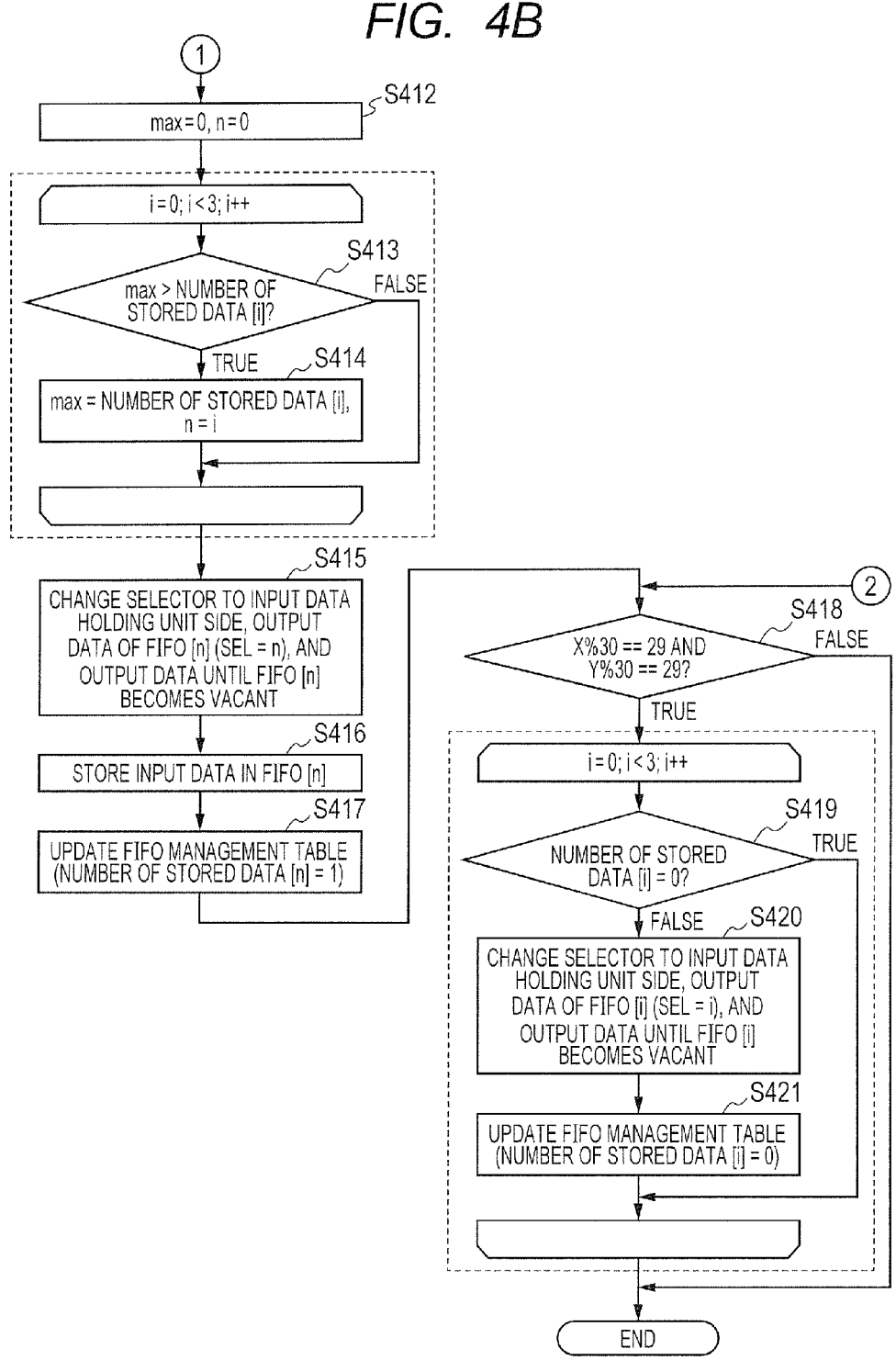
FIG. 4, which is composed of FIGS. 4A and 4B, is a flow chart indicating an example of a processing procedure to be performed by a data path controlling unit according to the first embodiment.

FIG. 4 is a flow chart indicating an example of the processing procedure to be performed by the data path controlling unit 205. Here, since the process in FIG. 4 is performed to one pixel data, it should be noted that this process is repetitively performed to all the pixel data input in sequence.

Initially, the process is started when the latest pixel data (R, G, B, X, Y) and the area label information (L) are received. Then, the head address Addr that the feature amount operating unit 103 accesses is operated from the input area label (S401). Incidentally, the head address is uniquely determined based on the area number L, as per Addr=L*0x100.

Next, it is decided whether or not the $9^{th}$ to $20^{th}$ bits of this address have been registered in the tag (S402), by deciding whether or not the tag to which the valid flag has been set coincides with the address Addr[19:8]. If it is decided that the relevant bits have been registered in the tag, the selection signal SEL is set to "11", and it is controlled to directly output the input pixel data and the input area label respectively to the pixel data selecting unit 203 and the area label selecting unit 204 (S403).

On the other hand, if it is decided in S402 that the relevant bits have not been registered in the tag, it is further decided whether or not the cleared valid flag exists, that is, whether or not the vacant cache line exists (S404). Then, if it is decided that the cleared valid flag exists, the process advances to S403.

On the other hand, if it is decided in S404 that the cleared valid flag does not exist, the FIFO management table 202 is searched to decide whether or not the input area label coincides with the label registered in the area 303 of "AREA LABEL" (S405). At this time, the target area label is assumed to be the valid area label of which the number of stored data is larger than "0".

If it is decided that the input area label coincides with the area label of the FIFO number "i", it is then decided whether or not the number of stored data in the FIFO[i] is a predetermined number (i.e., four in the present embodiment), that is, whether or not the FIFO[i] is filled full of data (S406). Then, if it is decided that the FIFO[i] is not full of data and thus data can further be stored, the input pixel data is stored in the FIFO[i](S407). Then, the number of stored data in the FIFO[i] is incremented by "1" (S408). At this time, it is controlled not to output any data to the feature amount operating unit 103.

On the other hand, if it is decided in S406 that the FIFO[i] is full of data, the selection signal SEL corresponding to the FIFO[i] is generated. Then, it is controlled to output the pixel data of the FIFO[i] and the area label registered on the FIFO management table respectively to the pixel data selecting unit 203 and the area label selecting unit 204 (S409). At this time, all the pixel data in the FIFO[i] are output. Next, the number of stored data of the corresponding area label on the FIFO management table 202 is set to "0" (S410). Then, the process advances to S403 to change the selection signal SEL to "11" and control to directly output the input pixel data and the input area label respectively to the pixel data selecting unit 203 and the area label selecting unit 204.

On the other hand, if it is decided in S405 that the input area label does not coincide with the area label of the FIFO management table 202, the area 302 of "NUMBER OF STORED DATA" is searched to decide whether or not the vacant FIFO of which the number of stored data is "0" exists (S411). If it is decided that the vacant FIFO of which the number of stored data is "0" exists, the process advances to S407 to store the input pixel data in the corresponding FIFO[i] and increment the number of stored data of the FIFO[i] by "1" (S408). At this time, it is controlled not to output any data to the feature amount operating unit 103.

On the other hand, if it is decided in S411 that the FIFO of which the number of stored data is "0" does not exist, variables max and n to be used for process are respectively initialized to search for the number of the FIFO of which the number of stored data is maximum (S412). Then, the area 302 of "NUMBER OF STORED DATA" is sequentially searched to decide whether or not the number of stored data is larger than the value max (S413). If it is decided that the number of stored data is larger than the value max, the value max is replaced by the value of the number of stored data, and the value of "i" at this time is substituted into "n" (S414).

When all the FIFO's have been searched in the manner as described above, the selection signal SEL corresponding to the FIFO[i] is generated. Then, it is controlled to output the pixel data in the FIFO[n] of which the number of stored data is maximum and the area label registered on the FIFO management table 202 respectively to the pixel data selecting unit 203 and the area label selecting unit 204 (S415). At this time, all the pixel data in the FIFO[n] are output. Then, the input pixel data is stored in the FIFO[n](S416), and the number of stored data in the number "n" on the FIFO management table is set to "1" (S417).

Next, it is decided whether or not the input pixel data is the final data of one block (S418). That is, it is decided whether or not the coordinates of the input pixel data satisfy the condition of X %30==29 and Y %30==29. If it is decided that the input pixel data is the final data, all the pixel data held and stored in the input data holding unit 201 are output to the feature amount operating unit 103 by the following procedure. First, on the FIFO management table 202, each FIFO is searched to decide whether or not the number of stored data is "0" (S419). If it is decided that the number of stored data for the FIFO is "0", then it is further decided whether or not the number of stored data for the next FIFO is "0".

On the other hand, if it is decided in S419 that the number of stored data is not "0", that is, if it is decided that the pixel data exists, the selection signal SEL corresponding to the FIFO[i] of which the number of stored data is not "0" is generated. Then, it is controlled to output the pixel data of the FIFO[i] and the area label registered on the FIFO management table respectively to the pixel data selecting unit 203 and the area label selecting unit 204 (S420). At this time, all the pixel data of the FIFO[i] are output. After then, the area 302 of "NUMBER OF STORED DATA" on the FIFO management table 202 is set to "0" (S421). On the other hand, if it is decided in S418 that the input pixel data is not the final data, the process skips S419 to S421 and ends.

Figure 8:
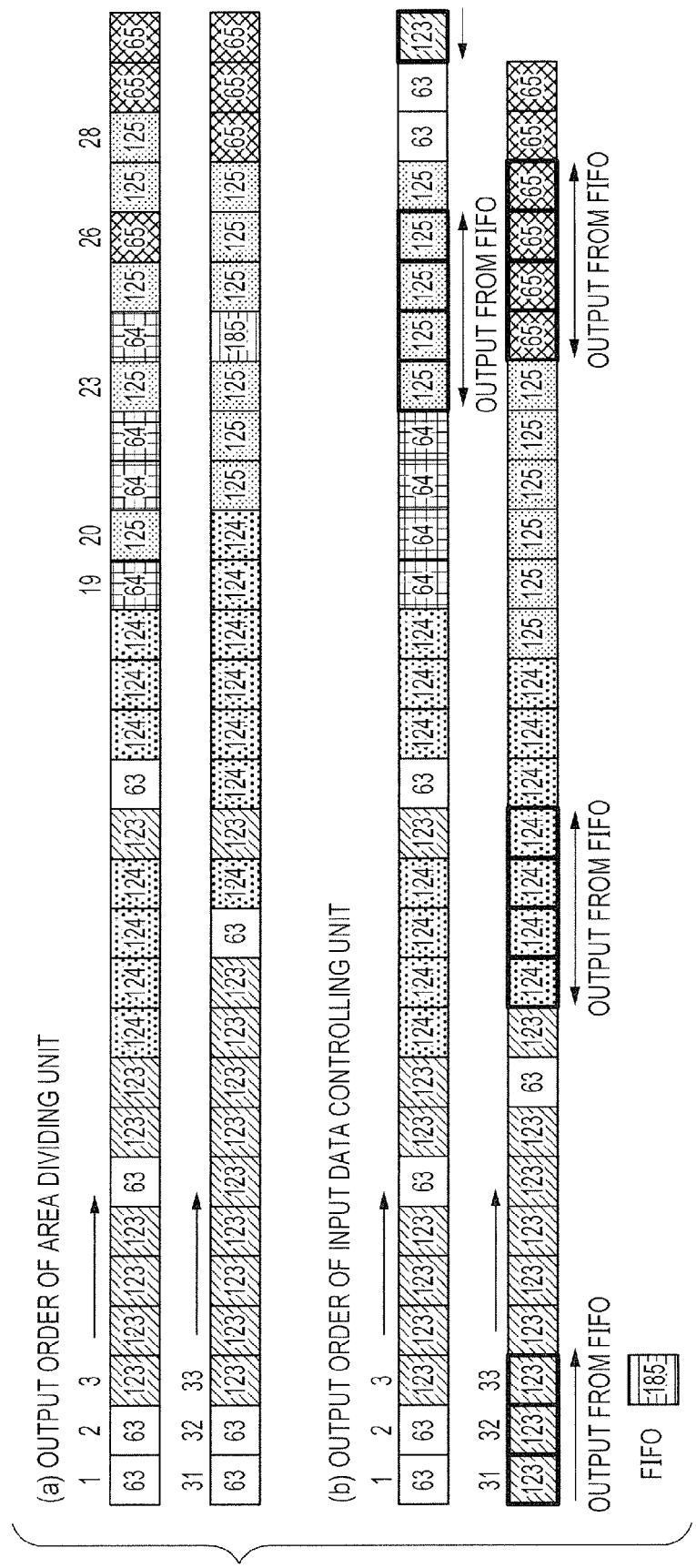
FIG. 8 is a diagram illustrating an example that input order and output order in the input data controlling unit are compared with each other, in the first embodiment.

FIG. 8 is a diagram which illustrates an example that the input order and the output order in the input data controlling unit 102 are compared with each other. In this example, the two lines are processed from (X, Y)=(30, 20) in the image data illustrated in FIG. 16. Here, (a) of FIG. 8 illustrates the output order of the divided area labels generated by the area dividing unit 101, and (b) of FIG. 8 illustrates the output order of the input data controlling unit 102.

Here, it is assumed that all the FIFO's of the input data holding unit 201 are vacant and all the valid flags of the cache 105 have been cleared. Initially, when the first area label "63" is obtained, the address Addr=0x80_3F00 is calculated (S401), and it is decided whether or not the valid tag coincides with "3F" (S402). In this case, since the valid flags have been all cleared (TRUE in S404), the input data is directly output (S403). Further, in the cache 105, the corresponding data is read from the external memory 106 and written to the cache data area to update the tag to "3F". Subsequently, when the second area label "63" is obtained, since the valid tag coincides with "3F" (TRUE in S402), the input data is directly output (S403).

Next, when the third area label "123" is obtained, the address Addr=0x80_7B00 is calculated (S401), and it is decided whether or not the valid tag coincides with "7B" (S402). In this case, since the valid flags corresponding to the three lines have been still cleared (TRUE in S404), the input data is directly output (S403). Then, the cache 105 reads the corresponding data from the external memory 106, and writes the read data to the cache data area to update the tag to "7B". As illustrated in (a) of FIG. 8, when the $19^{th}$ area label "64" is processed by repeatedly performing the above process, the valid flags are all set to the cache lines.

Next, when the $20^{th}$ area label "125" is obtained, since it is decided in S402 that there is no coincident tag and it is further decided in S404 that there is no cleared valid flag, the process advances to S405. Further, it is decided in S405 that there is no FIFO in which the input area label coincides with the area label, the FIFO of which the number of stored data is "0" is searched in S411. Then, since the FIFO[0] is vacant, the pixel data is stored in the FIFO[0](S407), the area 303 of "AREA LABEL" on the FIFO management table 202 is updated to "125", and the area 302 of "NUMBER OF STORED DATA" is updated to "1" (S408).

Next, when the $23^{rd}$ area label "125" is obtained, since it is decided in S402 that there is no coincident tag and it is further decided in S404 that there is no cleared valid flag, the process advances to S405. Then, since it is decided in S405 that the input area label coincides with the area label of the FIFO[0], the process advances to S406 to decide whether or not the FIFO[0] is full of data. In this case, since this FIFO is not full of data, the pixel data is stored in the FIFO[0] (S407), and the area 303 of "AREA LABEL" on the FIFO management table 202 is updated to "2" (S408).

Next, when the $26^{th}$ area label "65" is obtained, since it is decided in S402 that there is no coincident tag and it is further decided in S404 that there is no cleared valid flag, the process advances to S405. Then, since it is decided in S405 that there is no FIFO in which the input area label coincides with the area label, the FIFO of which the number of stored data is "0" is searched for in S411. Then, since the FIFO[1] is vacant, the pixel data is stored in the FIFO[1](S407), the area 303 of "AREA LABEL" on the FIFO management table 202 is updated to "65", and the area 302 of "NUMBER OF STORED DATA" is updated to "1" (S408).

Further, when the $28^{th}$ area label "125" is obtained, since it is decided in S402 that there is no coincident tag and it is further decided in S404 that there is no cleared valid flag, the process advances to S405. Then, since it is decided in S405 that the input area label coincides with the area label of the FIFO[0], the process advances to S406 to decide whether or not the FIFO[0] is full of data. In this case, since the number of stored data is "4", the process advances to S409. Then, all the pixel data of the FIFO[0] are output (S410), the area 302 of "NUMBER OF STORED DATA" on the FIFO management table 202 is set to "0" (S410), and the input data is output (S403). At this time, since there is no vacant cache line in the cache 105, the replacement occurs. Therefore, as illustrated in (b) of FIG. 8, the cache line of the tag of the address corresponding to the area label "123" for which the longest time has passed from the output from the input data controlling unit 102 is ejected, and the tag is updated to the tag of the address corresponding to the area label "125".

As described above, according to the processing procedure illustrated in FIG. 4, in the input data controlling unit 102, if the process is performed in the order illustrated in (a) of FIG. 8, then the data are output in the order illustrated in (b) of FIG. 8.

Figure 9:
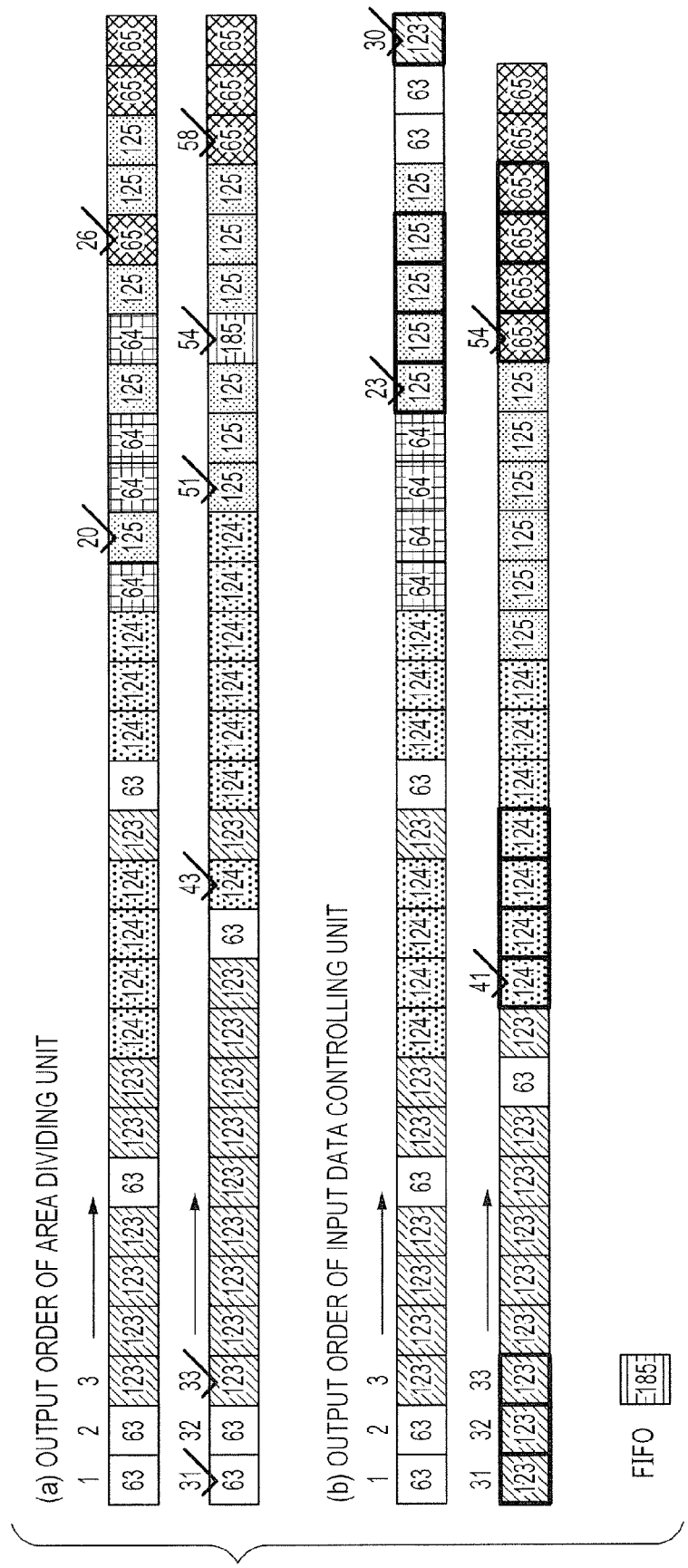
FIG. 9 is a diagram for describing an effect of process order replacement by the input data controlling unit.

FIG. 9 is a diagram for describing an effect of the process order replacement to be performed by the input data controlling unit 102. Here, (a) of FIG. 9 illustrates the cache miss points which occur when the replacement of the output order is not performed by the input data controlling unit 102, and (b) of FIG. 9 illustrates the cache miss points which occur when the replacement of the output order is performed by the input data controlling unit 102. Incidentally, it should be noted that the check marks in FIG. 9 respectively indicate the cache miss points.

As illustrated in (a) of FIG. 9, when the replacement of the output order is not performed by the input data controlling unit 102, the following process is performed in the cache 105. First, when the operation result of the $20^{th}$ area label "125" is requested, the operation result of the area label "123" is cached out, and the operation result of the area label "125" is transferred from the external memory 106. Then, when the operation result of the $26^{th}$ area label "65" is requested, the operation result of the area label "63" is cached out, and the operation result of the area label "65" is transferred from the external memory 106.

Subsequently, when the operation result of the $31^{st}$ area label "63" is requested, the operation result of the area label "124" is cached out, and the operation result of the area label "63" is transferred from the external memory 106. Then, when the operation result of the $33^{rd}$ area label "123" is requested, the operation result of the area label "64" is cached out, and the operation result of the area label "123" is transferred from the external memory 106.

When the operation result of the $43^{rd}$ area label "124" is requested, the operation result of the area label "125" is cached out, and the operation result of the area label "124" is transferred from the external memory 106.

Then, when the operation result of the $51^{st}$ area label "125" is requested, the operation result of the area label "65" is cached out, and the operation result of the area label "125" is transferred from the external memory 106.

When the operation result of the $54^{th}$ area label "185" is requested, the operation result of the area label "63" is cached out, and the operation result of the area label "185" is transferred from the external memory 106.

Then, when the operation result of the $58^{th}$ area label "65" is requested, the operation result of the area label "123" is cached out, and the operation result of the area label "65" is transferred from the external memory 106.

According to the above operation, the cache misses occur at the seven points. Further, the data of the same area label is repetitively cached out and again transferred from the external memory 106. In contrast, as illustrated in (b) of FIG. 9, when the replacement of the output order is performed by the input data controlling unit 102, the following process is performed.

When the operation result of the $23^{rd}$ area label "125" is requested, the operation result of the area label "123" is cached out, and the operation result of the area label "125" is transferred from the external memory 106. Then, when the operation result of the $30^{th}$ area label "123" is requested, the operation result of the area label "124" is cached out, and the operation result of the area label "123" is transferred from the external memory 106.

Further, when the operation result of the 41$^{st}$ area label "124" is requested, the operation result of the area label "64" is cached out, and the operation result of the area label "124" is transferred from the external memory 106. Then, when the operation result of the 54$^{th}$ area label "65" is requested, the operation result of the area label "63" is cached out, and the operation result of the area label "65" is transferred from the external memory 106.

Incidentally, although the data of the area label "185" corresponding to one pixel remains in the FIFO and is not yet processed, all the pixel data in the FIFO are output when processing the final pixel in the block. It can be understood that, by the above operation, the number of cache miss points is reduced to four.

As described above, according to the present embodiment, the cache miss in the cache 105 is reduced by the function of the input data controlling unit 102, so that a hit rate of the cache is improved. If the data size of the cache is increased as much as one area label, the memory size of 256 bytes (2048 bits) is further necessary.

On the other hand, in the input data holding unit 201 according to the present embodiment, since one stage of the FIFO is 42 bits, it is possible to suppress the cost for increasing a buffer corresponding to one area label. Thus, according to the data processing apparatus 100 in the present embodiment, it is possible to increase the hit rate of the cache and thus improve process performance while suppressing an increase of the circuit scale.

Second Embodiment

As described above, the pixel in the one block is allocated to the area label of the initially arranged representative point or the area label of the peripheral representative point of the initially arranged representative point, and there is a high probability that the proportion of the initial labels is larger than the proportion of the peripheral labels. More specifically, when the 3×3 representative points are arranged in one block of 30×30 pixels, there is a high probability that the area label of the central representative point exists in the rectangular area of 10×10 pixels based on the representative points in the initial state. That is, there is a high probability that, in the operating process of the feature amount, the operation result of the area label of the representative point is referred in the vicinity of the initial representative point.

Accordingly, in the present embodiment, the area label for which a frequency of appearance is predicted to be high is decided from the information of the coordinates at which the operating process of the feature amount is performed. Moreover, the plurality of data of other area labels are once accumulated in the FIFO and then output in a lump, thereby further suppressing the cache miss of the cache. However, in a case where the cache has a vacant area, the relevant data may directly be output. Moreover, in the cache, when the cache line to be replaced due to the cache miss is selected, the area label for which the frequency of appearance is predicted to be high is reminded, thereby reducing probability of the cache miss. Hereinafter, the present embodiment will be described in detail.

Figure 10:
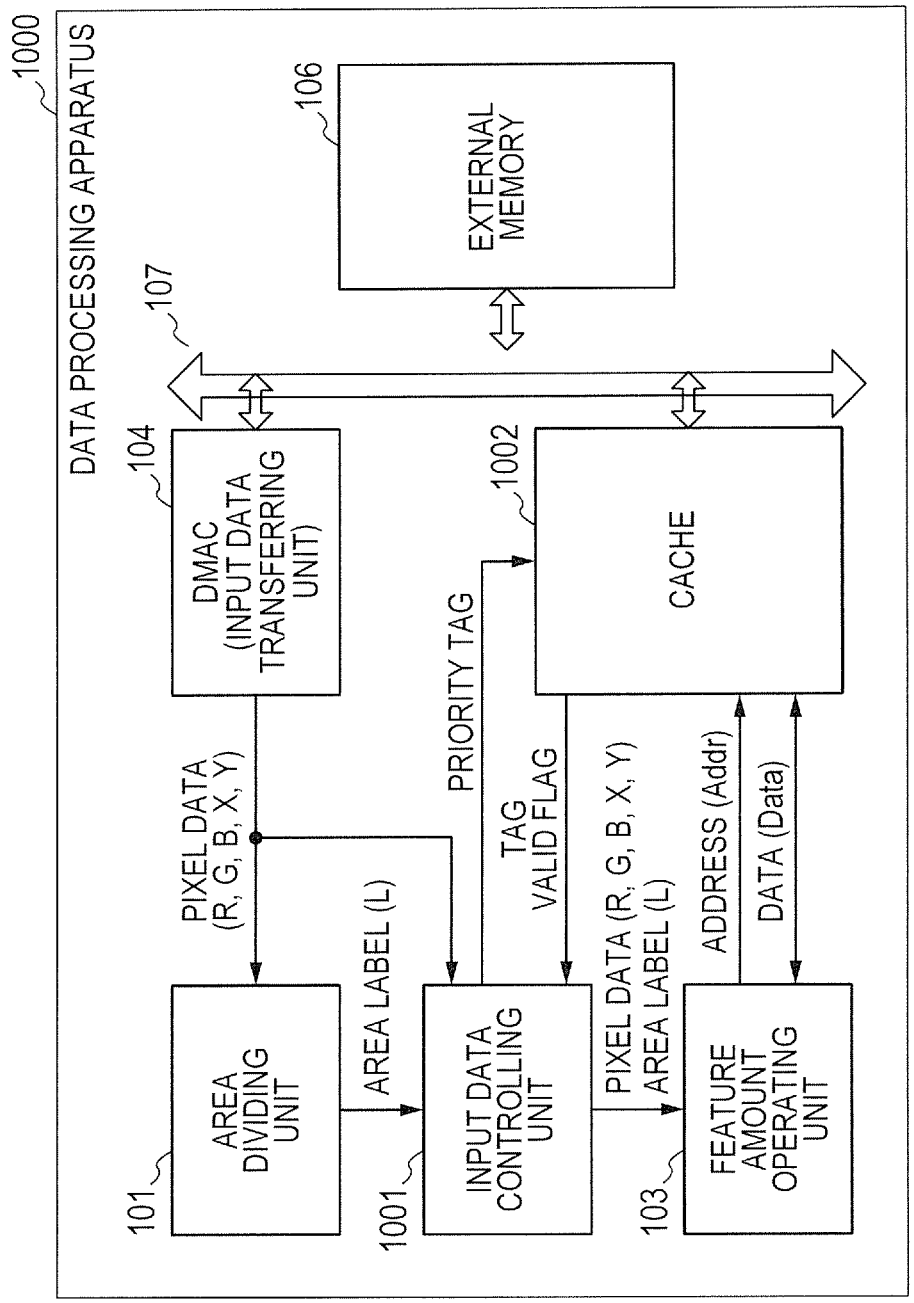
FIG. 10 is a block diagram illustrating a constitution example of a data processing apparatus according to the second embodiment.

FIG. 10 is a block diagram illustrating a constitution example of a data processing apparatus 1000 according to the present embodiment. Hereinafter, an example that the image data 1601 illustrated in FIG. 16 is processed by the data processing apparatus will be described.

In FIG. 10, an input data controlling unit 1001 has the function approximately same as that of the input data controlling unit 102 of FIG. 1. Moreover, the input data controlling unit 1001 has a function to decide a priority area label that the data of the coordinates (X, Y) is received and preferentially processed without being accumulated in the FIFO and generate a priority tag to be remained when updating the cache. A cache 1002 has the function approximately same as that of the cache 105 of FIG. 1. Moreover, the cache has a function to use the information of the priority tag when replacing the cache 1002.

Figure 11A:
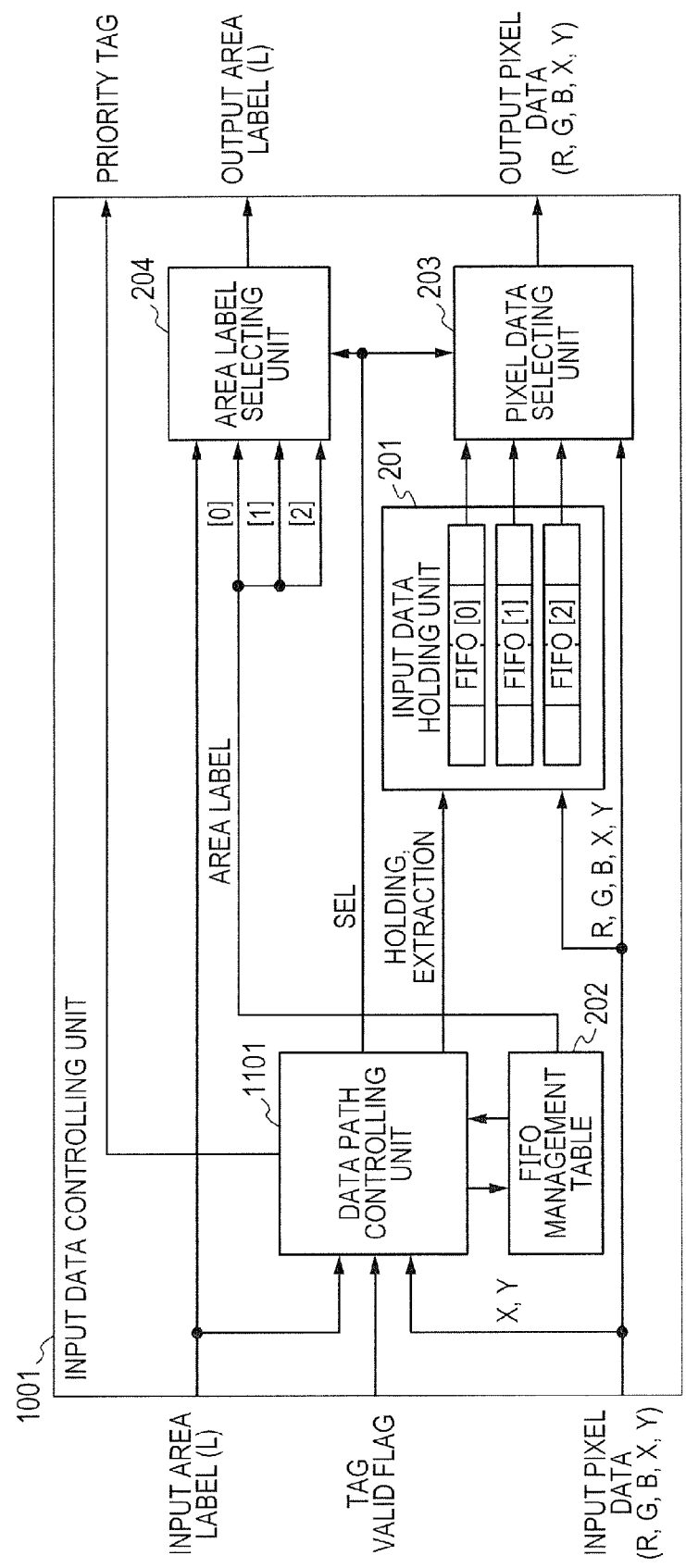
FIGS. 11A and 11B are block diagrams illustrating respective internal constitution examples of an input data controlling unit and a cache according to the second embodiment.

FIG. 11A is a block diagram illustrating an internal constitution example of the input data controlling unit 1001 in the present embodiment. Hereinafter, only the portion different from the input data controlling unit 102 of FIG. 1 will be described.

A data path controlling unit 1101 has the function approximately same as that of the data path controlling unit 205 of FIG. 2. In addition, the data path controlling unit has a function to receive the data of the coordinates (X, Y), decide a priority area label that the received data is preferentially processed, and generate a priority tag corresponding to the priority area label. The image data to be processed in the present embodiment corresponds to the block of 30×30 pixels to which the 3×3 initial labels are allocated. When the image data are scanned and processed in raster order, the priority area label is changed for each ten lines. Then, the three initial labels arranged in the ten lines are set as the priority area labels for which the frequency of appearance is high.

Figure 17:
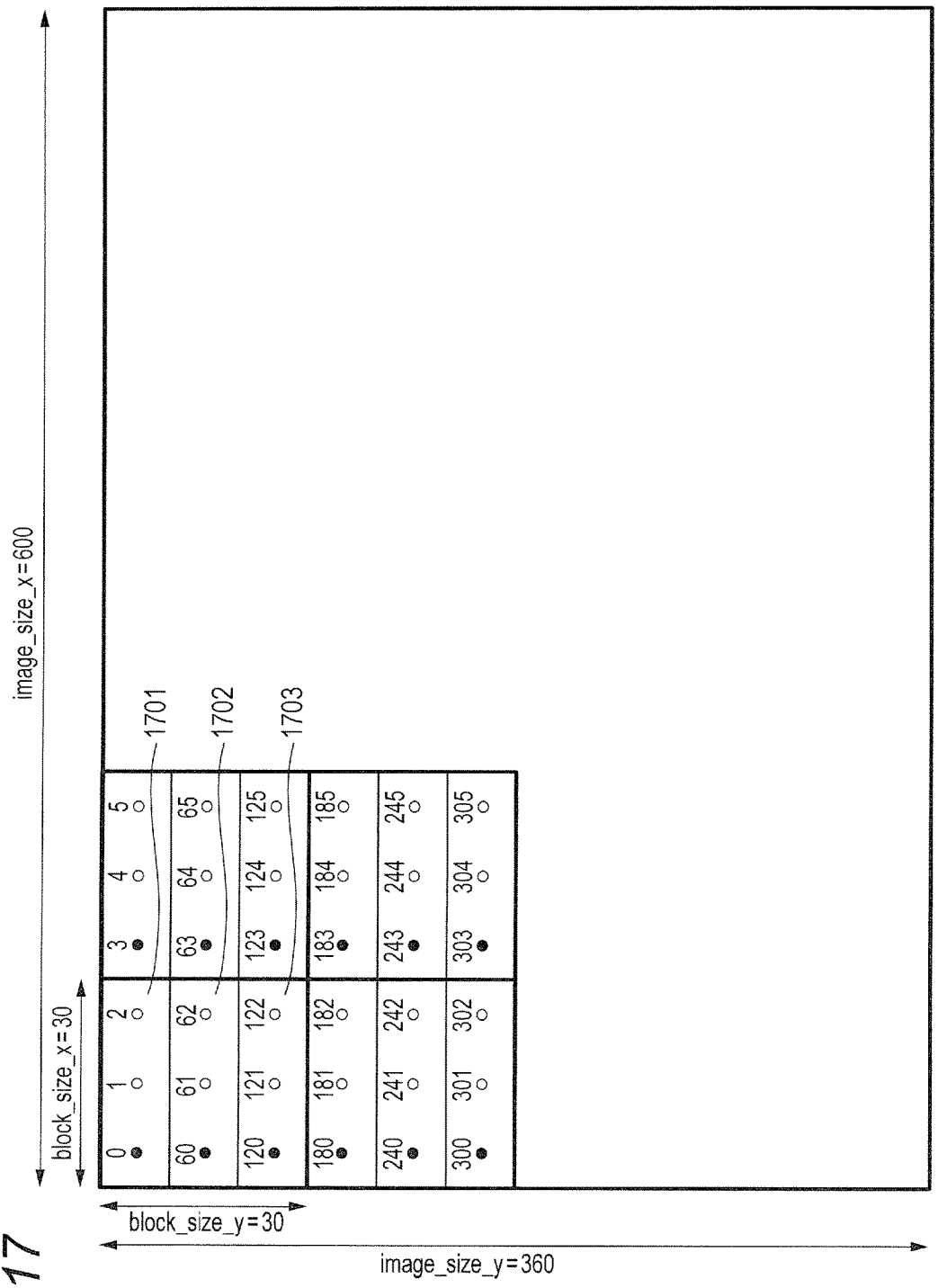
FIG. 17 is a block diagram for describing relation of the X and Y coordinates for process and priority area labels.

FIG. 17 is a block diagram for describing the relation of the X and Y coordinates for the process and the priority area labels. For example, the area labels 0, 1 and 2 are set as the priority area labels in regard to the coordinates of an area 1701, the area labels 60, 61 and 62 are set as the priority area labels in regard to the coordinates of an area 1702, and the area labels 120, 121 and 122 are set as the priority area labels in regard to the coordinates of an area 1703.

In the present embodiment, in a case where the coordinates (X, Y)=(X %30=0, Y %10=0) at the time when the area is changed are processed, the belonging head priority area label is obtained by 60*(Y/10)+X/10. Therefore, the priority area labels can be decided as 60*(Y/10)+X/10, 60*(Y/10)+X/10+1, and 60*(Y/10)+X/10+2.

Figure 11B:
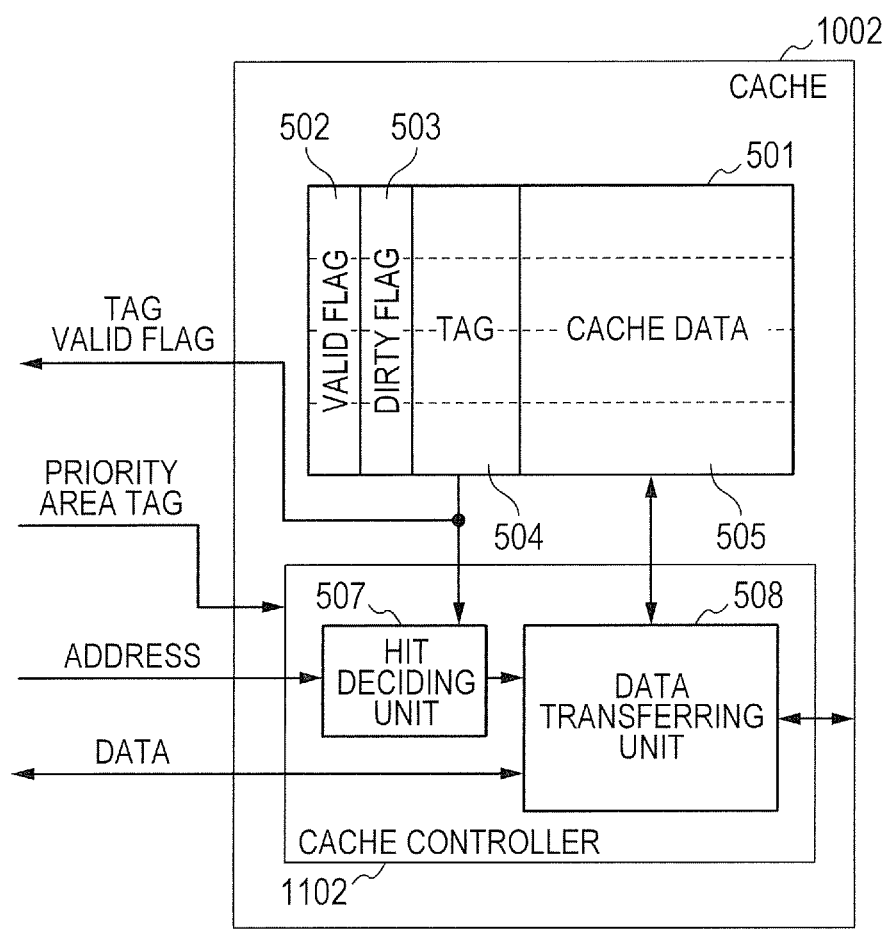

FIG. 11B is a block diagram illustrating an internal constitution example of the cache 1002 in the present embodiment. Hereinafter, only the portion different from the internal constitution of the cache 105 of FIG. 1 will be described.

A cache controller 1102 of the cache 1002 has, in addition to the function of the cache controller 506 of FIG. 5, a function to use information of a priority tag when replacing the cache 1002. In the cache controller 1102, also the tag designated as the priority tag is managed by the LRU queue, and replaced when the priority tag is changed.

Figure 12B:
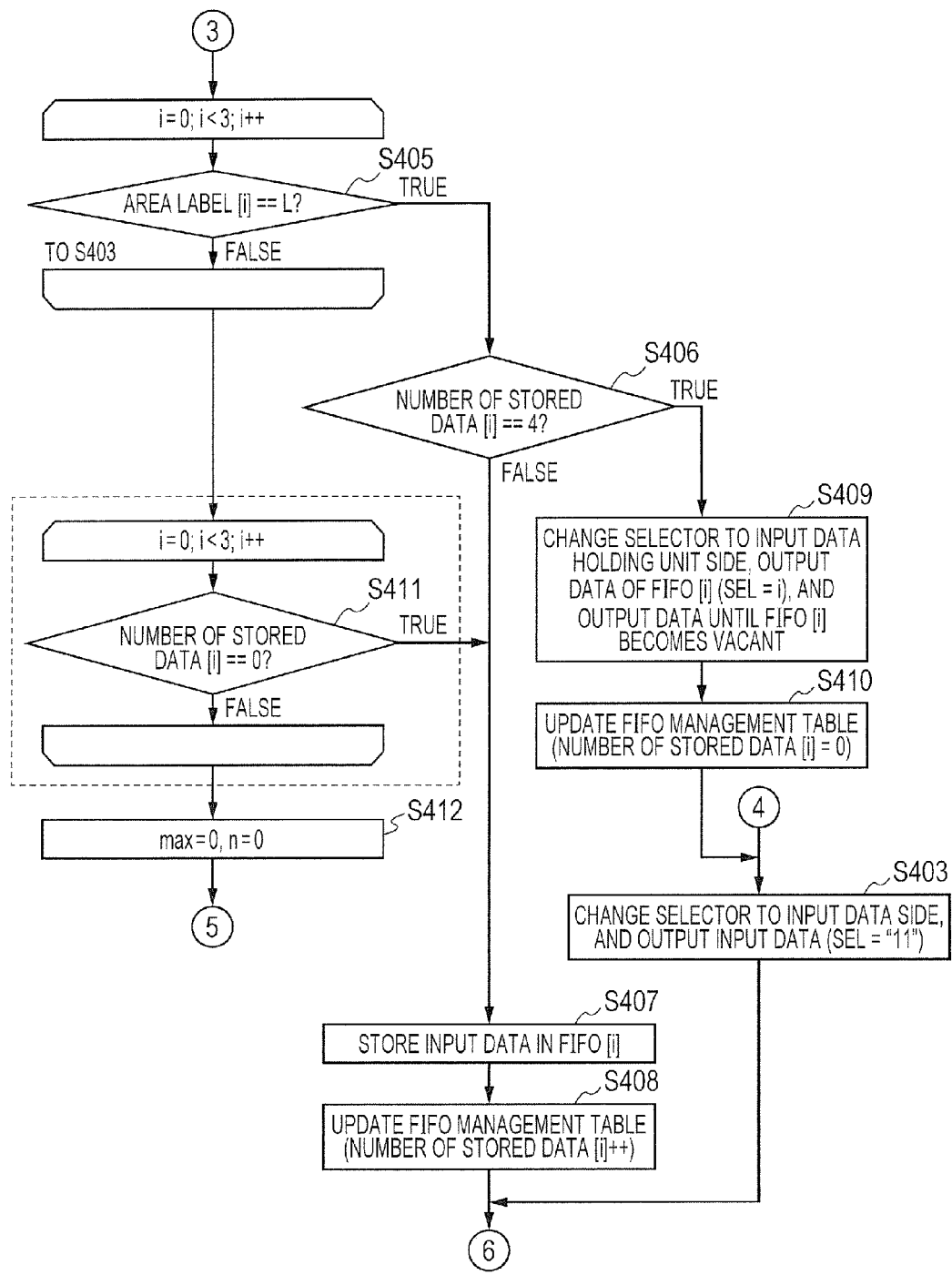
FIG. 12, which is composed of FIGS. 12A, 12B and 12C, is a flow chart indicating an example of a processing procedure to be performed by a data path controlling unit according to the second embodiment.
Figure 12C:
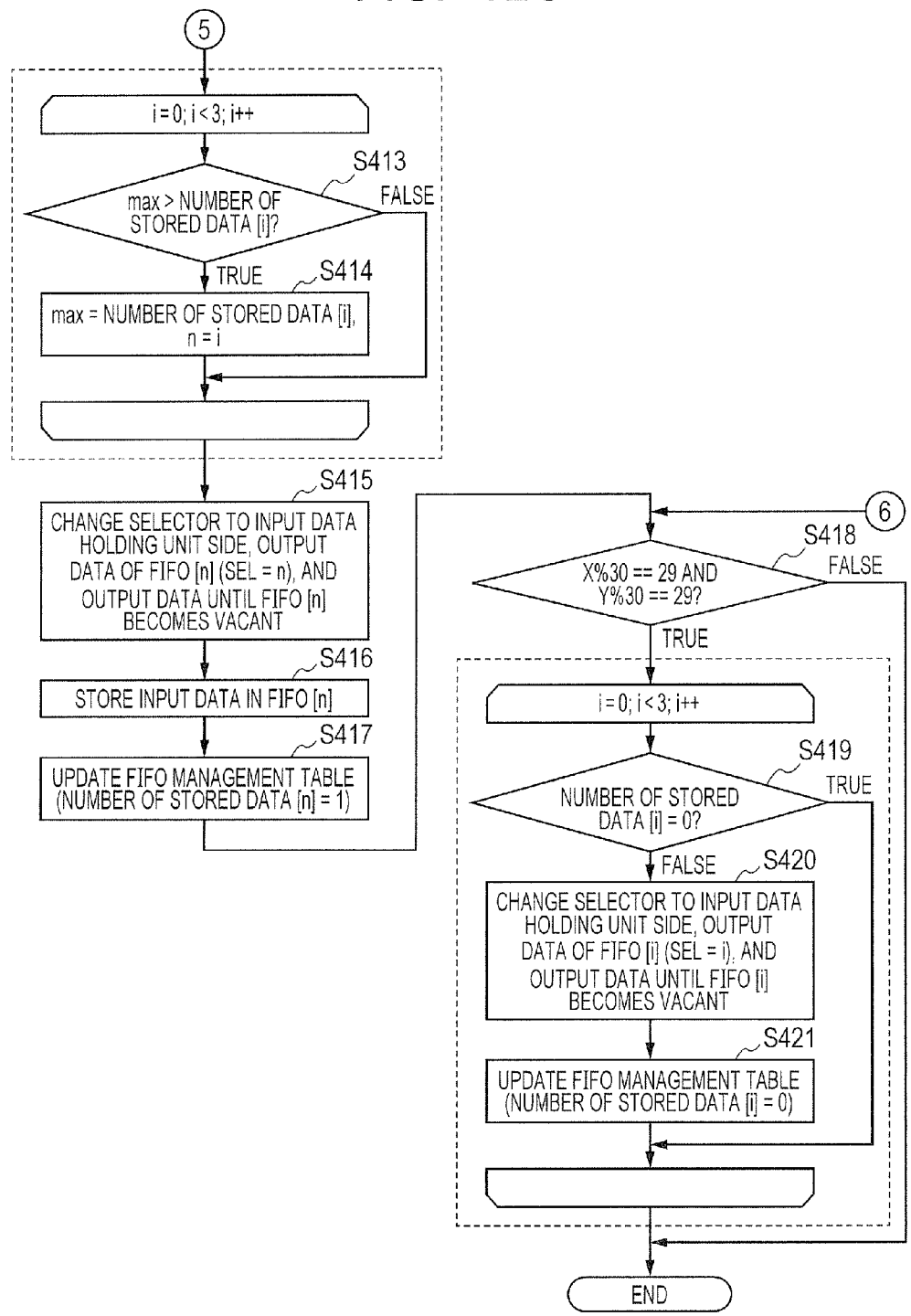

FIG. 12 is a flow chart indicating an example of the processing procedure to be performed by the data path controlling unit 1101 according to the present embodiment. Hereinafter, only the portions different from the processing procedure illustrated in FIG. 4 will be described.

Initially, the process is started when the pixel data (R, G, B, X, Y) and the area label information (L) are received. Then, it is decided from the data of the coordinates (X, Y) whether or not it is time to change the priority area label (S1200). If it is decided that it is time to change the priority area label, the three priority area labels to be prioritized are determined (S1201), and the priority tag is calculated from the determined priority area label (S1202). On the other hand, if it is decided in S1200 that it is not time to change the priority area label, the process skips S1201 and S1202 and advances to S1203.

Next, it is decided whether or not the received area label information (L) coincides with the priority area label (S1203). If it is decided that the received area label information coincides with the priority area label, the process advances to S403 to set the selection signal SEL to "11". Then, it is controlled to directly output the input pixel data and the input area label respectively to the pixel data selecting unit 203 and the area label selecting unit 204. On the other hand, if it is decided in S1203 that the received area label information does not coincide with the priority area label, the process advances to S401 to perform the process same as that in the first embodiment.

Figure 13:
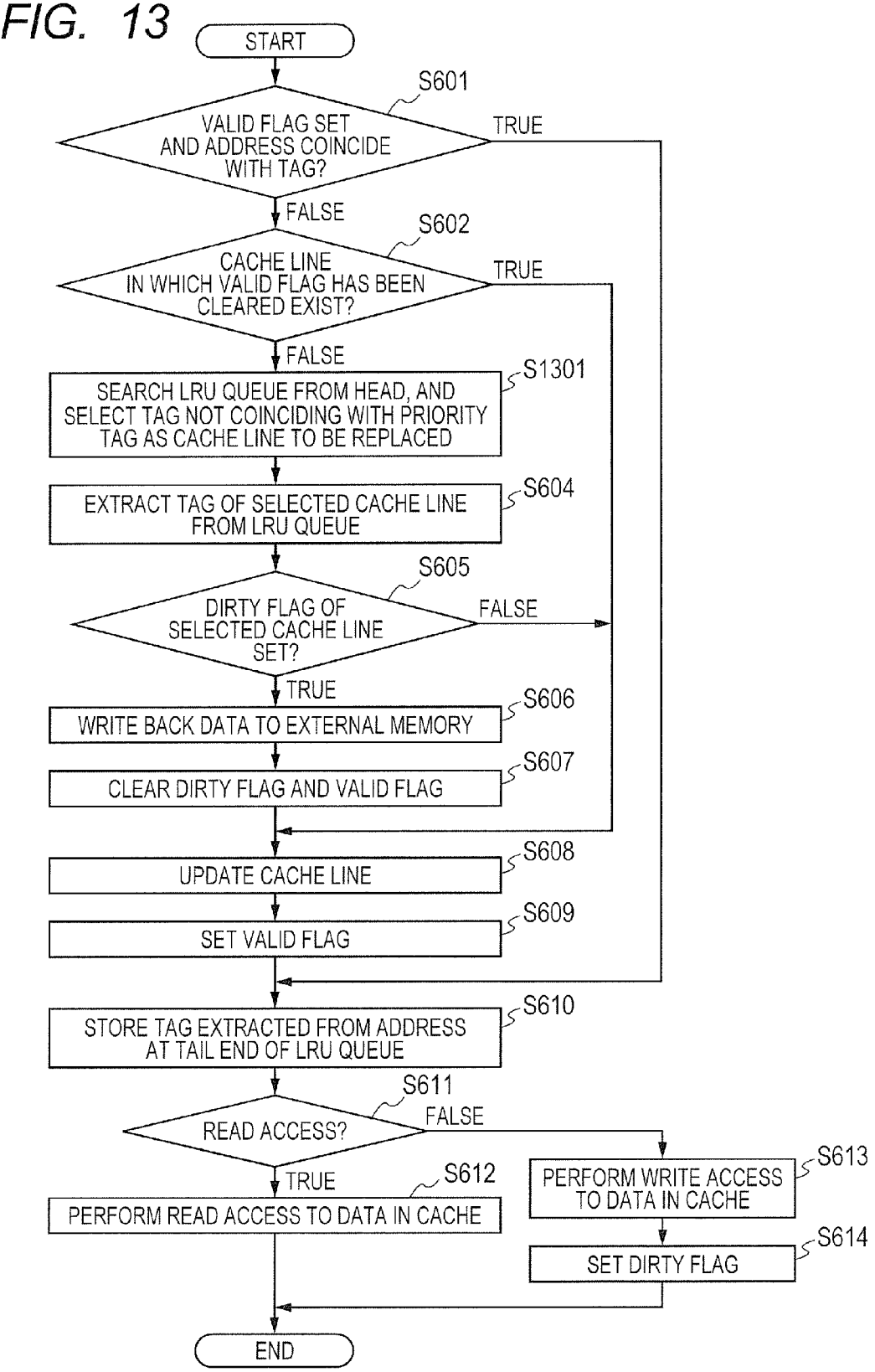
FIG. 13 is a flow chart indicating an example of a processing procedure to be performed by a cache controller according to the second embodiment.

FIG. 13 is a flow chart indicating an example of the processing procedure to be performed by the cache controller 1102 according to the present embodiment. Hereinafter, only the portion different from the processing procedure illustrated in FIG. 6 will be described.

If it is decided in S601 that the cache miss occurs and it is further decided in S602 that the cache line in which the valid flag has been cleared does not exist, the LRU queue is searched from the head thereof, and the tag which does not coincide with the priority tag and is closest to the head is selected as the cache line to be replaced (S1301).

Figure 14:
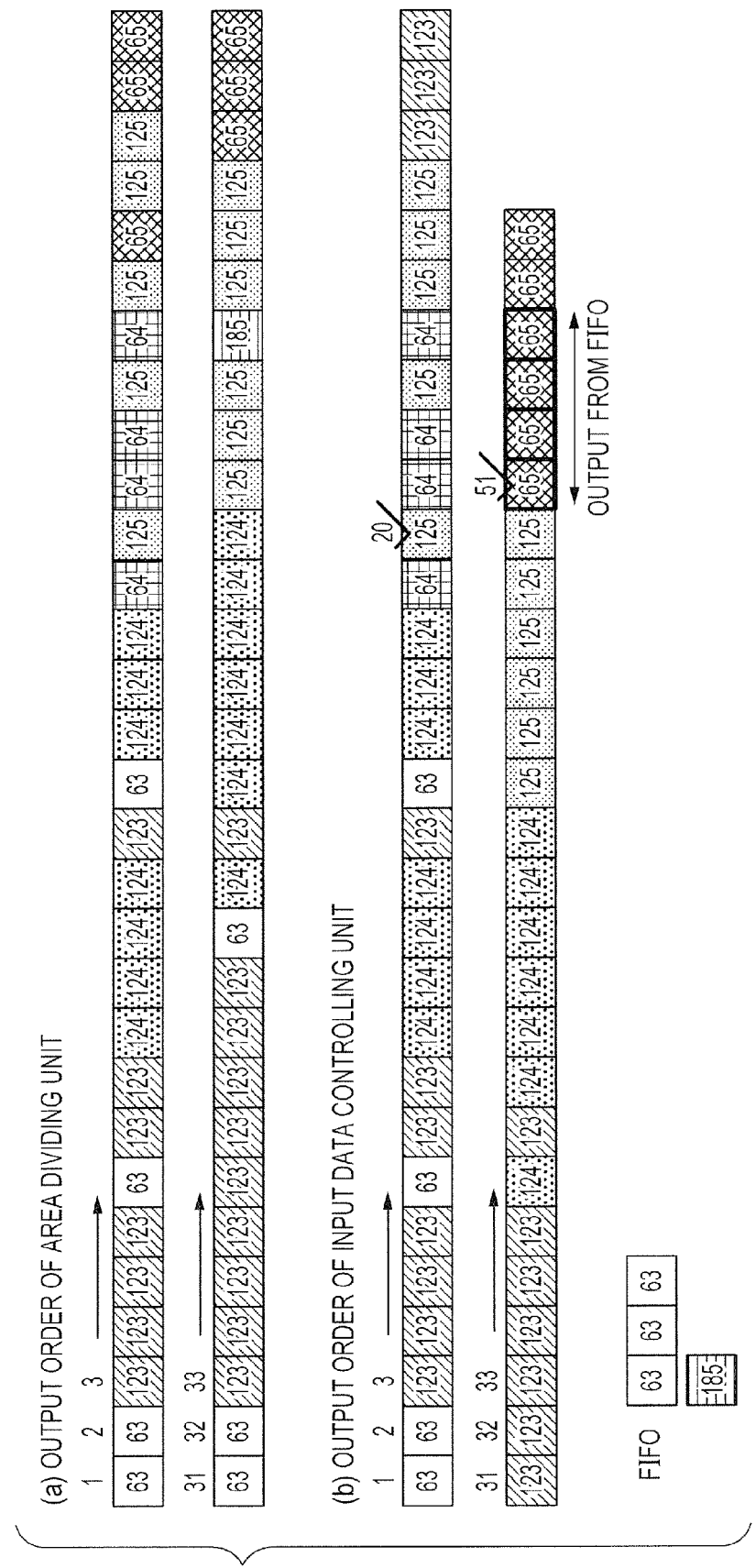
FIG. 14 is a diagram for describing an effect of process order replacement by the input data controlling unit.

FIG. 14 is a diagram which illustrates an example that the input order and the output order in the input data controlling unit 1001 are compared with each other. In this example, the two lines are processed from (X, Y)=(30, 20) in the image data 1601 illustrated in FIG. 16. Here, (a) of FIG. 14 illustrates the output order of the divided area labels generated by the area dividing unit 101, and (b) of FIG. 14 illustrates the output order of the input data controlling unit 1001.

When the first input pixel data and the area label "63" are obtained, since the coordinate data (X, Y) of the input pixel data is (30, 20), the input data controlling unit 1001 decides that it is time to change the priority area label (TRUE in S1200). Then, the area labels "123", "124" and "125" are determined as the priority area labels (S1201), and output as the priority tags to the cache 1002 (S1202). Although the relevant labels are not decided as the priority area labels in S1203, they are directly output in S404 because the cleared valid flag exists (S403). Subsequently, the data other than the area labels "123", "124" and "125" and the area label "63" that the tag is being in the cache 1002 are stored in the FIFO.

As just described, when the input data controlling unit 1001 performs the process according to the processing procedure of FIG. 12, the data are output in the order illustrated in (b) of FIG. 14. Incidentally, in (b) of FIG. 14, the check marks respectively indicate the cache miss points of the cache 1002 occurred when the process is performed by the feature amount operating unit 103.

According to the flow chart of FIG. 13, the following process is performed in the cache 1002.

When the operation result of the $20^{th}$ area label "125" is requested, the operation result of the area label "63" which is not the priority area label is cached out, and the operation result of the area label "125" is transferred from the external memory 106. Further, when the operation result of the $51^{st}$ area label "65" is requested, the operation result of the area label "64" which is not the priority area label is cached out, and the operation result of the area label "65" is transferred from the external memory 106. Incidentally, although the data of the area label "63" corresponding to three pixels and the data of the area label "185" corresponding to one pixel remain in the FIFO and are not yet processed, all the data in the FIFO are output when processing the final pixel in the block.

As described above, according to the present embodiment, since the area labels "123", "124" and "125" of which the frequency of appearance is high are not cached out, whereas the area labels "65", "63" and "185" of which the frequency of appearance is low are once accumulated in the FIFO and then processed. Thus, it is possible to further reduce the occurrence of the cache miss.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-220598, filed Oct. 29, 2014, which is hereby incorporated by reference herein in its entirety.

What is claimed is:

1. A data processing apparatus comprising:
a controlling unit configured to receive a plurality of input pixel data and respective attribute information thereof, and output the input pixel data and the attribute information in an order based on the attribute information;
an operating unit configured to perform an accumulating operation on the input pixel data output from the controlling unit, by referring to a past accumulating operation result related to the attribute information of the input pixel data; and
a holding unit configured to hold the past accumulating operation result of the operating unit, wherein the controlling unit controls the order of outputting the plurality of input pixel data, based on whether or not the past accumulating operation results related to the respective attribute information of the plurality of input pixel data are held in the holding unit.

2. The data processing apparatus according to claim 1, wherein the controlling unit controls to preferentially output, in the plurality of input pixel data, the input pixel data for which the past accumulating operation result related to the attribute information thereof is held in the holding unit.

3. The data processing apparatus according to claim 1, wherein
in a case where the past accumulating operation result related to the attribute information output by the controlling unit is held in the holding unit, the holding unit outputs the held accumulating operation result to the operating unit, and
in a case where the past accumulating operation result related to the attribute information output by the controlling unit is not held in the holding unit, the holding unit reads the past accumulating operation result related to the output attribute information from an external memory and outputs the read accumulating operation result to the operating unit.

4. The data processing apparatus according to claim 1, wherein
the controlling unit can hold the input pixel data, and
in a case where the past accumulating operation result related to the attribute information of the input pixel data latest received by the controlling unit is not held in the holding unit and a case where the number of the input pixel data, related to the attribute information, received in the past and held in the controlling unit does not reach a predetermined number, the controlling unit temporarily holds the input pixel data latest received and the attribute information thereof together with the input pixel data received in the past.

5. The data processing apparatus according to claim 1, wherein
the controlling unit can hold the input pixel data, and
in a case where the past operation result related to the attribute information of the input pixel data latest received by the controlling unit is not held in the holding unit and a case where the number of the input pixel data, related to the attribute information, received in the past and held in the controlling unit reaches a predetermined number, the controlling unit outputs the input pixel data latest received and the attribute information thereof together with the input pixel data received in the past.

6. The data processing apparatus according to claim 1, wherein
the controlling unit can hold the input pixel data for each attribute information, and
in a case where the input pixel data satisfies a predetermined condition, the controlling unit controls the order of outputting the input pixel data so as to output all the input pixel data of specific attribute information received in the past and held in the holding unit.

7. The data processing apparatus according to claim 1, wherein the controlling unit decides whether or not the attribute information of the input pixel data is attribute information to be preferentially processed, and controls the order of outputting the input pixel data according to a decision result.

8. The data processing apparatus according to claim 7, wherein the holding unit replaces the operation result to be held therein, according to the decision result of the attribute information to be preferentially processed by the controlling unit.

9. The data processing apparatus according to claim 1, wherein
the attribute information includes a pixel label representing an area to which the pixel data belongs, and
the accumulating operation of the pixel data is performed for each area.

10. A data processing method comprising:
receiving a plurality of input pixel data and respective attribute information thereof;
outputting the input pixel data and the attribute information in an order based on the attribute information; and
performing an accumulating operation on the output input pixel data by referring to a past accumulating operation result related to the attribute information of the output input pixel data, wherein
the order of outputting the plurality of input pixel data is controlled based on whether or not the past accumulating operation results related to the respective attribute information of the plurality of input pixel data are held in a holding unit capable of holding the past accumulating operation result in the accumulating operation.

11. A non-transitory computer-readable storage medium which stores a program to cause a computer to perform:
a controlling step of receiving a plurality of input pixel data and respective attribute information thereof, and outputting the input pixel data and the attribute information in an order based on the attribute information; and
an operating step of performing an accumulating operation on the input pixel data output in the controlling step, by referring to a past accumulating operation result related to the attribute information of the input pixel data, wherein
in the controlling step, the order of outputting the plurality of input pixel data is controlled based on whether or not the past accumulating operation results related to the respective attribute information of the plurality of input pixel data are held in a holding unit capable of holding the past accumulating operation result in the operating step.

* * * * *